United States Patent
Wang et al.

(10) Patent No.: US 9,374,189 B2
(45) Date of Patent: Jun. 21, 2016

(54) METHOD AND APPARATUS FOR INTERFERENCE MITIGATION IN TIME DIVISION DUPLEX SYSTEMS

(71) Applicant: BlackBerry Limited, Waterloo (CA)

(72) Inventors: Yiping Wang, Allen, TX (US); Jianfeng Weng, Kanata (CA); Jun Li, Richardson, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 167 days.

(21) Appl. No.: 13/725,427

(22) Filed: Dec. 21, 2012

(65) Prior Publication Data

US 2014/0177485 A1    Jun. 26, 2014

(51) Int. Cl.
| | |
|---|---|
| H04L 1/00 | (2006.01) |
| H04L 1/16 | (2006.01) |
| H04W 52/00 | (2009.01) |
| H04W 52/24 | (2009.01) |
| H04W 72/12 | (2009.01) |

(52) U.S. Cl.
CPC .. *H04L 1/00* (2013.01); *H04L 1/16* (2013.01); *H04W 52/00* (2013.01); *H04W 52/243* (2013.01); *H04W 72/1231* (2013.01)

(58) Field of Classification Search
None
See application file for complete search history.

(56) References Cited

U.S. PATENT DOCUMENTS

| 2004/0063433 A1 | 4/2004 | Garrison | |
|---|---|---|---|
| 2007/0177501 A1 | 8/2007 | Papasakellariou | |
| 2009/0201867 A1 | 8/2009 | Teo et al. | |
| 2009/0252075 A1 | 10/2009 | Ji et al. | |
| 2010/0311450 A1* | 12/2010 | Rinne et al. | 455/501 |
| 2011/0070824 A1 | 3/2011 | Braithwaite | |
| 2011/0176435 A1 | 7/2011 | Khandekar et al. | |
| 2011/0255431 A1 | 10/2011 | Wang et al. | |
| 2012/0075989 A1 | 3/2012 | Roessel et al. | |
| 2012/0082038 A1 | 4/2012 | Xu et al. | |
| 2012/0230232 A1* | 9/2012 | Ji et al. | 370/280 |
| 2012/0250565 A1* | 10/2012 | Zhang et al. | 370/252 |
| 2012/0322453 A1 | 12/2012 | Weng et al. | |
| 2013/0012249 A1* | 1/2013 | Centonza et al. | 455/501 |
| 2013/0294268 A1* | 11/2013 | Xu et al. | 370/252 |

(Continued)

FOREIGN PATENT DOCUMENTS

| WO | 2011/011758 | 1/2011 |
|---|---|---|
| WO | 2012/095745 | 7/2012 |

(Continued)

OTHER PUBLICATIONS

International Search Report and Written Opinion mailed May 13, 2013; in PCT patent application No. PCT/US12/71476.

(Continued)

*Primary Examiner* — Diane Lo
(74) *Attorney, Agent, or Firm* — Fish & Richardson P.C.

(57) ABSTRACT

Methods and apparatus at an evolved Node B (eNB) and user equipment (UE) in cells operating in time division duplex with a first configuration and having a neighbor cell eNB operating in time division duplex with a second configuration, the methods and apparatus: identifying potential eNB-to-eNB; UE-to-UE; eNB-to-UE; and UE-to-eNB interference. Further methods and apparatus to report interference including enumerated interference types to neighbor cell eNBs. Further, methods and apparatus for interference mitigation.

22 Claims, 12 Drawing Sheets

(56) References Cited

U.S. PATENT DOCUMENTS

| | | | |
|---|---|---|---|
| 2015/0078220 A1* | 3/2015 | Hu | H04W 24/08 370/280 |
| 2015/0098368 A1* | 4/2015 | Hu et al. | 370/280 |

FOREIGN PATENT DOCUMENTS

| | | |
|---|---|---|
| WO | 2012121574 A2 | 9/2012 |
| WO | 2012155323 A1 | 11/2012 |

OTHER PUBLICATIONS

International Search Report and Written Opinion of the International Searching Authority, mailed Mar. 13, 2013, in PCT application No. PCT/US12/71459.

3GPP TS 36.211 v11.0.0 (Sep. 2012): "Evolved Universal Terrestrial Radio Access (E-UTRA); Physical Channels and Modulation (Release 11)".

3GPP TS 36.331 v11.1.0 (Sep. 2012): "Evolved Universal Terrestrial Radio Access (E-UTRA); Radio Resource Control (RRC) Protocol specification Release 11".

Catt, Ericsson, 3GPP TSG-RAN Meeting #51, Kansas City, USA, Mar. 15-18, 2010, RP-110450, "New study item proposal for further enhancements to LTE TDD for DL-UL interference management and traffic adaptation".

Catt, 3GPP TSG RAN WG1 Meeting #69, Prague, Czech Republic, May 21-25, 2012, R1-122879, "Evaluation on TDD UL/DL reconfiguration with interference mitigation in multi-cell Pico scenario". ftp://ftp.3gpp.org/tsg_ran/WG1_RL1/TSGR1_69/Docs/.

Catt, 3GPP TSG RAN WG1 Meeting #69, Prague, Czech Republic, May 21-25, 2012, R1-122061, "Discussion on interference mitigation schemes for FS_LTE_TDD_eIMTA". ftp://ftp.3gpp.org/tsg_ran/WG1_RL1/TSGR1_69/Docs/.

Intel Corporation, 3GPP TSG-RAN WG1 #68bis, Jeju, Korea, Mar. 26-30, 2012, R1-121529, "Performance analysis of DL-UL interference management and traffic adaptation in multi-cell Pico-Pico deployment scenario", ftp://ftp.3gpp.org/tsg_ran/WG1_RL1/TSGR1_68b/Docs/.

Alcatel-Lucent Shanghai Bell, Alcatel-Lucent, 3GPP TSG RAN WG1 Meeting #69, Prague, Czech Republic, May 21-25, 2012, R1-122507, "Evaluation for multiple outdoor pico-cells scenario with macro layer and discussion on interference mitigation". ftp://ftp.3gpp.org/tsg_ran/WG1_RL1/TSGR1_69/Docs/.

Cambridge Broadband Networks, "Backhauling X2," http://cbnl.com/sites/all/files/userfiles/files/Backhauling-X2_0.pdf (Apr. 2011).

E. Tiirola and J. Ylitalo, "Performance evaluation of fixed-beam beamforming in WCDMA downlink", IEEE Int. Conf Vehicular Tech. Spring, VTC-2000-Sprint, vol. 2, pp. 700-704, (2000), http://ieeexplore.ieee.org/stamp/stamp.jsp?arnumber=851215.

QualComm Europe, "Enhancing link adaptation in HetNets", R1-094885, 3GPP TSG-RAN WG1, #59, Nov. 2009, ftp://ftp.3gpp.org/tsg_ran/WG1_RL1/TSGR1_59/Docs/.

G. Liu, J. Zhang, D. Jiang, L. Lei, Q. Wang, and F. Qin, "Downlink interference coordination and mitigation for future LTE-Advanced Systems", Proc. of the 15th Asia-Pacific Conference on Commun. (APCC 2009)-052, pp. 225-229, Jan. 2010. http://ieeexplore.ieee.org/xpl/freeabs_all.jsp?arnumber=5375651.

TS36.423, "Evolved Universal Terrestrial Radio Access Network (E-UTRAN); X2 Application Protocol (X2AP) (Release 11)", V11.2.0, Sep. 2012.

G. Fodor, C. Koutsimanis, A. Racz, N. Reider, A. Simonsson, and W. Muller, "Intercell interference coordination in OFDMA networks and in the 3GPP long term evolution system", J. Commun., Academy Publisher, vol. 4, No. 7, Aug. pp. 445-453, 2009, http://www.academypublisher.com/ojs/index.php/jcm/article/download/0407445453/14.

X. Mao, A. Maaref, and K. H. Teo, "Adaptive soft frequency reuse for inter-cell interference coordination in SC-FDMA based 3GPP LTE uplinks", IEEE GLOBECOM 2008, pp. 1-6, Nov. 2008, http://www.merl.com/papers/docs/TR2008-083.pdf.

M. Bohge, J. Gross, and A. Wolisz, "Optimal power masking in soft frequency reuse based OFDMA networks", Proc. European Wireless Conf (EW'09), pp. 162-166, May 2009, http://www.tkn.tuberlin.de/publications/papers/Bohge_Gross_EW_09.pdf.

TS36.214, "3rd Generation Partnership Project; Technical Specification Group Radio Access Network; Evolved Universal Terrestrial Radio Access (E-UTRA); Physical layer—measurements (Release 8)", V8.7.0, Sep. 2009, http://www.3gpp.org/ftp/Specs/html-info/36214.htm.

T. Nakamura, "LTE Rel-9 and LTE-Advanced in 3GPP", May 19, 2009, http://www.3g4g.co.uk/LteA/LteA_Pres_0905_NttDoCoMo.pdf.

H. Viswanathan, et al, "Adaptive fractional frequency reuse for Rev C", C30-20061030-045, TSG-C WG3, Oct. 2006.

Lucent et al, "Harmonized proposal on DRCH/BRCH multiplexing and FFR", C30-20070108-038R1, TSG-C WG3 (Jan. 2007).

Extended European Search Report issued in EP Application No. 12890598.1 on Feb. 19, 2016; 6 pages.

\* cited by examiner

METHOD AND APPARATUS FOR INTERFERENCE MITIGATION IN TIME DIVISION DUPLEX SYSTEMS

FIELD OF THE DISCLOSURE

The present disclosure relates to mobile networks and in particular relates to mobile networks implementing time division duplex uplink and downlink configurations.

BACKGROUND

In various mobile networks, downlink and uplink transmissions may be organized into one of two duplex modes. The two duplex modes are frequency division duplex (FDD) mode and time division duplex (TDD) mode. The FDD mode uses a paired spectrum to separate the uplink (UL) and downlink (DL) transmissions. The TDD mode, on the other hand, uses a common spectrum and relies on time multiplexing to separate uplink and downlink transmissions.

With frequency division duplex systems, assuming that neighboring cells are time synchronized, interference caused by the neighboring cells can be seen in the downlink as evolved node B (eNB) to user equipment (UE) inter-cell interference in subframes designated for downlink transmissions or in the uplink as UE-to-eNB inter-cell interference in subframes designated for uplink transmissions. Thus, the interference is created by a neighboring eNB during downlink subframes or a UE in a neighboring cell in uplink subframes.

Conversely, in TDD systems, neighboring cells may not have the same TDD configuration. In this case, there are instances where an uplink subframe on a first network occurs at the same time as a downlink subframe in a second network. In this case, there may be eNB inter-cell interference in subframes designated for opposition downlink/uplink transmissions across cells. Further, there also may be UE-to-UE inter-cell interference in subframes designated for opposite downlink/uplink transmissions across cells. Such interference may degrade system performance, especially near cell edges.

BRIEF DESCRIPTION OF THE DRAWINGS

The present disclosure will be better understood with reference to the drawings, in which.

DETAILED DESCRIPTION OF THE DRAWINGS

Figure 1:
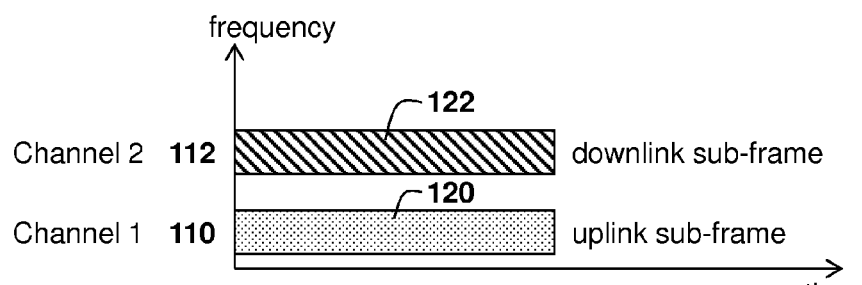
FIG. 1 is a block diagram showing an example of uplink and downlink subframes in a frequency division duplex mode.

The present disclosure provides a method at an evolved Node B (eNB) for a cell operating in time division duplex with a first configuration and having a neighbor cell eNB operating in time division duplex with a second configuration, the method comprising: identifying whether a subframe has a potential for eNB-to-eNB interference; correlating a received signal with a locally generated cell specific reference signal according to an identifier for the neighbor cell eNB; and determining that eNB-to-eNB interference exists in the subframe if results of the correlating exceed a threshold.

The present disclosure further provides an evolved Node B (eNB) for a cell and operating in time division duplex with a first configuration and having a neighbor cell eNB operating in time division duplex with a second configuration, the evolved Node B comprising: a processor; and a communications subsystem, wherein the eNB is configured to: identify whether a subframe has a potential for eNB-to-eNB interference; correlate a received signal with a locally generated cell specific reference signal according to an identifier for the neighbor cell eNB; and determine that eNB-to-eNB interference exists in the subframe if results of the correlating exceed a threshold.

The present disclosure further provides a method at an evolved Node B (eNB) for a cell operating in time division duplex with a first configuration and having a neighbor cell eNB operating in time division duplex with a second configuration, the method comprising: identifying whether a subframe has a potential for UE-to-UE interference; calculating a first negative acknowledgment (NAK) rate base on a percentage of NAKs received from a user equipment in a first set of subframes; calculating a second NAK rate base on a percentage of NAKs received from the user equipment in a second set of subframes; and determining that UE-to-UE interference exists in the first NAK rate exceeds the second NAK rate by a threshold.

The present disclosure further provides an evolved Node B (eNB) for a cell and operating in time division duplex with a first configuration and having a neighbor cell eNB operating in time division duplex with a second configuration, the eNB comprising: a processor; and a communications subsystem, wherein the eNB is configured to: identify whether a subframe has a potential for UE-to-UE interference; calculate a first negative acknowledgment (NAK) rate base on a percentage of NAKs received from a user equipment in a first set of subframes; calculate a second NAK rate base on a percentage of NAKs received from the user equipment in a second set of subframes; and determine that UE-to-UE interference exists in the first NAK rate exceeds the second NAK rate by a threshold.

The present disclosure further provides a method at a user equipment (UE) served by an evolved node B (eNB) using time division duplex with a first configuration, the eNB having a neighbor cell eNB operating in time division duplex with a second configuration and having at least one neighbor user equipment, the method comprising: tracking a downlink channel impulse response for eNB; estimating received total power per resource block; computing a rise over thermal interference power; averaging the rise over thermal interference power based on a first set of subframes and a second set of subframes; finding a differential between the averaged rise over thermal interference power for the first set of subframes and the second set of subframes; and if the differential exceeds a threshold, determining that UE-to-UE interference exists.

The present disclosure further provides a user equipment (UE) served by an evolved node B (eNB) using time division duplex with a first configuration, the eNB having a neighbor cell eNB operating in time division duplex with a second configuration and having at least one neighbor user equipment, the user equipment comprising: a processor; and a communications subsystem, wherein the user equipment is configured to: track a downlink channel impulse response for eNB; estimate received total power per resource block; compute a rise over thermal interference power; average the rise over thermal interference power based on a first set of subframes and a second set of subframes; find a differential between the averaged rise over thermal interference power for the first set of subframes and the second set of subframes; and if the differential exceeds a threshold, determine that UE-to-UE interference exists.

The present disclosure further provides a method at an evolved Node B (eNB) for a cell operating in time division duplex with a first configuration and having a neighbor cell eNB operating in time division duplex with a second configuration, the method comprising: receiving, from the neighbor cell eNB, an interference indication containing an indication of an interference type; and performing interference mitigation based on the interference type.

The present disclosure further provides an evolved Node B (eNB) for a cell and operating in time division duplex with a first configuration and having a neighbor cell eNB operating in time division duplex with a second configuration, the eNB comprising: a processor; and a communications subsystem, wherein the eNB is configured to: receive, from the neighbor cell eNB, an interference indication containing an indication of an interference type; and perform interference mitigation based on the interference type.

The present disclosure is described below with regard to the 3$^{rd}$ Generation Partnership Project (3GPP) Long Term Evolution (LTE) Network Architecture. However, the present disclosure is not limited to LTE and other network architectures including a TDD mode may also utilize the interference mitigation embodiments described herein.

In some embodiments, LTE TDD is able to provide a more flexible deployment than LTE FDD, since TDD does not require paired spectrum resources. Specifically, with FDD systems, the number of uplink and downlink time slots is static, which may not reflect actual network loading. In many instances, more downlink traffic may exist than uplink traffic, and thus an allocation of more downlink resources may be beneficial to increase data throughput in the network.

LTE TDD allows for asymmetric uplink/downlink (UL/DL) allocations by providing seven semi-statically configured UL-DL configurations. The rate of change between these configurations is semi-static and based on system information changes. Under current LTE specifications, the configurations may change, but such changes are time limited to 640 ms or more. Therefore, although these allocations can provide between 40% and 90% downlink subframes, the semi-static uplink/downlink allocation may not match the instantaneous traffic situation. This is especially true in small cell deployments, such as within malls or stadiums with similar user behavior at a particular time and various other types of behaviors during different times in the vicinity. Other situations may include mass calling events. Other situations may include pico or femto cells where the number of UEs in the cell is small.

Since TDD configuration changes in current systems may not be fast enough, various LTE future proposals contemplate a fast rate cell-independent reconfiguration of uplink and downlink allocations. However, if the independent reconfiguration occurs, it is very likely that neighboring cells may use different uplink/downlink configurations, and such varied configurations may cause interference between eNBs (eNB-to-eNB) and interference among UEs (UE-to-UE). Such eNB-eNB and UE-UE inference does not exist in FDD systems.

The embodiments provided in the present disclosure provide solutions to deal with interference issues arising from neighboring cells with different TDD uplink/downlink configurations.

Reference is now made to FIG. 1, which shows downlink and uplink transmissions for an FDD mode. In particular, the embodiment of FIG. 1 has a first channel 110 and a second channel 112. Channel 110 is used for uplink subframes 120, while channel 112 is used for downlink subframes 122.

Figure 2:
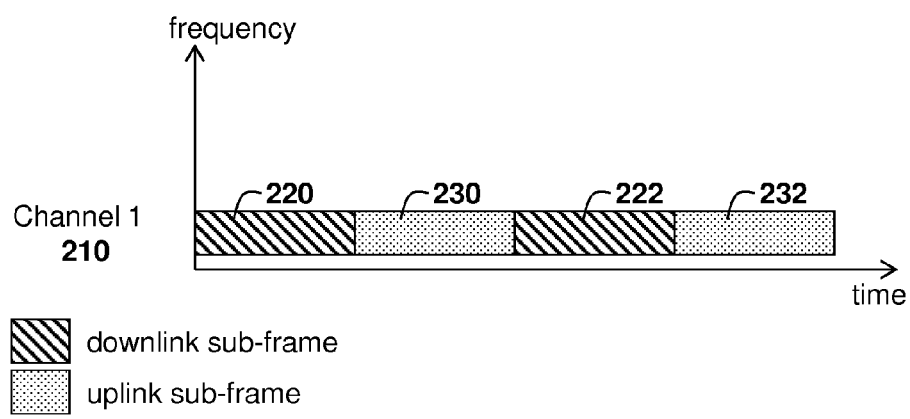
FIG. 2 is a block diagram showing an example of uplink and downlink subframes in a time division duplex mode.

Referring to FIG. 2, a time division duplex system is shown having only one channel 210, where the downlink and uplink subframes are duplexed together on to the channel. In particular, downlink subframes 220 and 222 are interspersed with uplink subframes 230 and 232.

While the embodiment of FIG. 2 shows an alternation between uplink and downlink subframes, other configurations are possible. Specifically, in a 3GPP LTE TDD system, a subframe of a radio frame can be a downlink, an uplink or a special subframe. The special subframe comprises downlink and uplink time regions separated by a guard period to facilitate downlink to uplink switching. The 3GPP Technical Specification (TS) 36.211, *"Evolved Universal Terrestrial Radio Access (E-UTRA); Physical Channels and Modulation"*, v. 11.0.0, Sep. 19, 2012, the contents of which are incorporated herein by reference, defines seven different uplink/downlink configuration schemes in LTE TDD operations. They are shown below with regard to Table 1.

TABLE 1

| | | | | | | | | | | | |
|---|---|---|---|---|---|---|---|---|---|---|---|
| LTE TDD Uplink-Downlink Configurations | | | | | | | | | | | |
| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

LTE TDD Uplink-Downlink Configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, the "D" is for downlink subframes, the "U" is for uplink subframes, and "S" is for special subframes. Each special subframe includes three parts. These are a downlink pilot time slot (DwPTS), an uplink pilot time slot (UpPTS), and a guard period (GP). Downlink physical downlink shared channel (PDSCH) transmissions may be made in a DL subframe or in the DwPTS portion of a special subframe.

Thus, as shown in Table 1 above, there are two switching point periodicities specified in the LTE standard for TDD. The two time standards are 5 ms and 10 ms, of which the 5 ms switching point periodicity is introduced to support the co-existence between LTE and a low chip rate Universal Terrestrial Radio Access (UTRA) TDD systems. The 10 ms switching point periodicity is for the coexistence between LTE and a high chip rate UTRA TDD system.

The supported seven uplink/downlink configurations cover a wide range of uplink/downlink allocations, ranging from downlink heavy 1:9 ratios in configuration 5 to uplink heavy 3:2 ratios in configuration 0.

Based on the configurations, as compared to FDD systems, TDD systems have more flexibility in terms of the flexible proportion of resources assignable to uplink and downlink communications within a given assignment of spectrum. In other words, TDD systems can distribute the radio resources unevenly between the uplink and the downlink, enabling potentially more efficient radio resource utilization by selecting an appropriate uplink/downlink configuration based on interference situations and different traffic characteristics in the uplink and downlink.

Within current LTE specifications, an eNB can announce a change in the TDD UL/DL configuration to the UEs through a System Information Block Type1 (SIB1) message, but the eNB still needs to follow the system information modification period. Basically, the eNB needs to page all UEs in the cell to inform a system information (SI) update in the next modification period.

The allowable minimum system information change periodicity is 640 ms. In addition, since the eNB must page UEs with a system information modification period during the entire modification period preceding the modification period boundary where system information is changed, there is a minimum of a 640 ms time lag, equal to the modification period length between the time instant when the eNB wishes to change the UL/DL configuration and the time instant when the new UL/DL configuration becomes effective.

Many applications for mobile devices have a fast packet arrival time and/or large packet size. These may include, but are not limited to, network gaming and peer-to-peer communications, where the traffic intensity between the uplink and downlink may change rapidly. Moreover, in a small cell TDD deployment scenario, the traffic type may be similar in the vicinity of the small cell and change simultaneously over time. In pico and femto cells, the number of UEs in the cell is likely to be very few and, as such, the overall traffic intensity distribution between uplink and downlink tends to vary significantly over time.

The semi-static change of TDD UL/DL configuration at a rate of 640 ms may lead to inefficient use of system radio resources. As indicated above, proposals exist for dynamic TDD UL/DL configuration changes with traffic adaptation. For example, fast adaptation at a time scale of 10 ms may give a better performance than slow adaptations such as 640 ms or 200 ms.

Interference

In TDD systems, all cells are likely to be time synchronized in order to mitigate downlink and uplink inter-cell interference. Depending on the TDD uplink/downlink configurations, there are typically four types of inter-cell interference. These are: downlink eNB-to-UE inter-cell interference in subframes designated for downlink transmissions; uplink UE-to-eNB inter-cell interference in subframes designated for uplink transmissions; eNB-to-eNB inter-cell interference in subframes designated for opposite downlink/uplink transmissions across cells; and UE-to-UE inter-cell interference in subframes designated for opposite downlink/uplink transmissions across cells.

In subframes across cells designated for the same link direction, either downlink or uplink, one of the first two types of interference can occur. In subframes designated for opposite link directions (downlink in one cell but uplink in a neighbor-cell), the last two types of interference can occur simultaneously. Each of the types of interference is described below.

Figure 3:
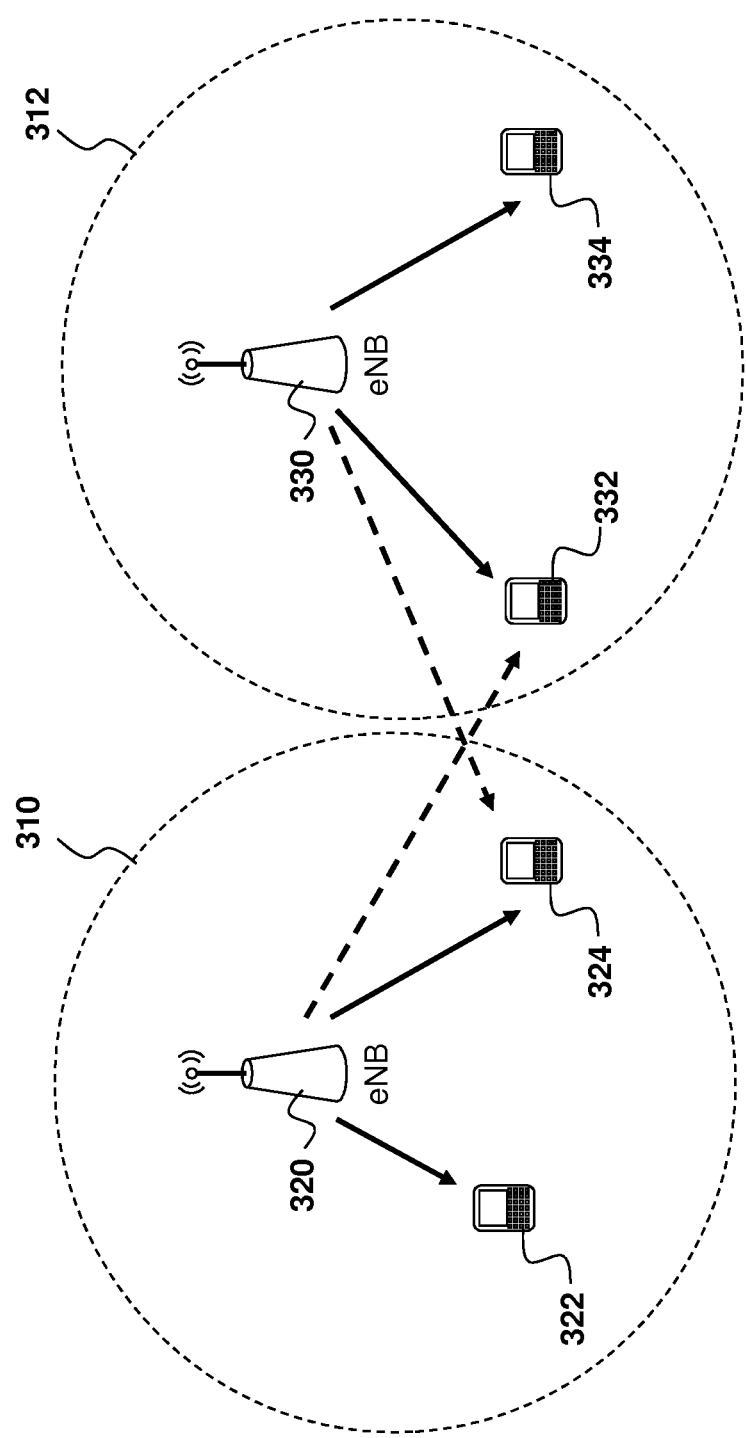
FIG. 3 is block diagram showing an example of neighboring cells causing downlink eNB-to-UE interference.

Reference is now made to FIG. 3 which shows an example of downlink eNB-to-UE interference within subframes designated for downlink transmissions. Thus, within such subframes, UEs that see downlink signals from more than one eNB may suffer from downlink eNB-to-UE inter-cell interference.

In the example of FIG. 3, a first cell 310 and a second cell 312 are neighboring cells. The first cell 310 includes an eNB 320 serving UEs 322 and 324.

Similarly, cell 312 has an eNB 330 serving UEs 332 and 334.

UEs 324 and 332 are in an area where downlink signals from both eNBs 320 and 330 can be seen. Conversely, UEs 322 and 334 can only see signals from their respective eNBs. As a result, UE 324 sees interference from eNB 330 and UE 332 sees interference from eNB 320.

Downlink eNB-to-UE inter-cell interference happens both in TDD and FDD systems. Common interference mitigation solutions include downlink frequency re-use schemes, downlink power allocation, beam-forming and switching, load indication exchange between eNBs, among others.

Figure 4:
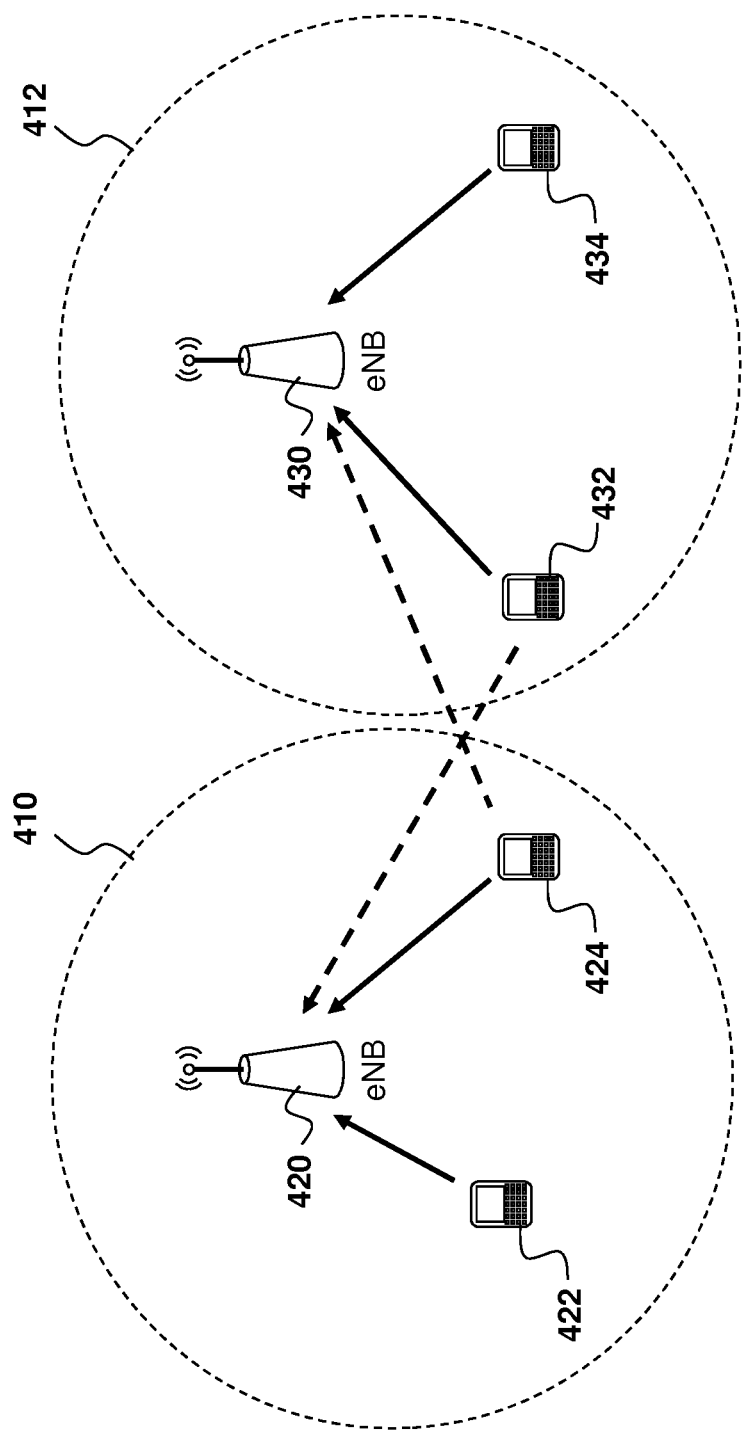
FIG. 4 is a block diagram showing an example of neighboring cells causing uplink UE-to-eNB interference.

Reference is now made to FIG. 4, which shows an example of uplink UE-to-eNB inter-cell interference. In particular, with subframes designated for uplink transmissions, uplink signals from UEs in one cell may be seen at a neighbor cell eNB, resulting in uplink UE-to-eNB inter-cell interference.

Thus, a first cell 410 is a neighbor to a second cell 412. Cell 410 includes an eNB 420 serving UEs 422 and 424. Similarly, in the second cell 412, an eNB 430 serves UEs 432 and 434.

In the example of FIG. 4, uplink transmissions from UE 424 or UE 432 may cause uplink UE-to-eNB inter-cell interference. Conversely, UEs 422 and 434 may be far enough from the other cell that no interference would be caused. In particular, an uplink transmission from UE 424 may be seen by both the serving eNB 420 but also may be seen by eNB 430. Similarly, uplink transmissions from eNB 432 may be seen by both serving eNB 430 but also by eNB 420.

Uplink UE-to-eNB inter-cell interference is possible in both TDD and FDD systems. Common interference mitigation techniques such as those described above with regard to downlink eNB-to-UE inter-cell interference techniques may also be employed for such uplink interference.

Figure 5:
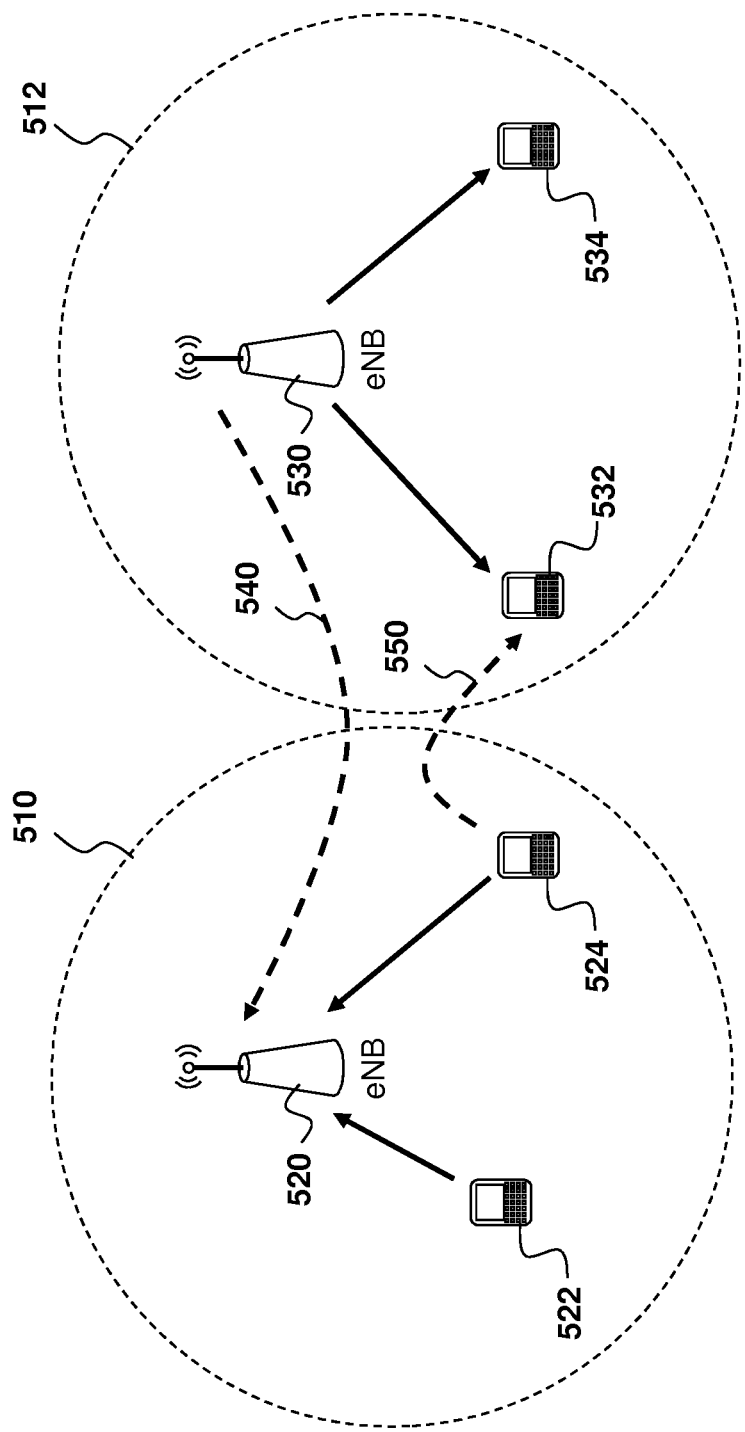
FIG. 5 is a block diagram showing an example of neighboring cells causing UE-to-UE and eNB-to-eNB interference.

Reference is now made to FIG. 5, which shows an example of both eNB-to-eNB inter-cell interference as well as UE-to-UE inter-cell interference. In particular, a cell 510 is, in the example of FIG. 5, designated for uplink transmissions in a particular subframe while cell 512 is designated for downlink transmissions in the same subframe.

Within cell 510 an eNB 520 serves UE 522 and UE 524.

Similarly, within cell 512 an eNB 530 serves UE 532 and UE 534.

Since the subframe is a downlink subframe for cell 512, eNB 530 may transmit downlink information for either UE 532 or UE 534.

Further, since cell 510 is designated for uplink transmission in the same subframe, UE 524 or UE 522 may transmit to eNB 520.

However, if eNB 530 is transmitting to a cell edge to reach a UE such as UE 532, its signal may be received at eNB 520 since eNB 520 is listening for uplink transmissions. This is referred to as eNB-to-eNB inter-cell interference, and is shown with line 540.

Similarly, since UE 524 may be transmitting in the uplink in the particular example, UE 532, which is close to the cell 512 boundary and listening for downlink transmission, is close enough to be interfered with by the uplink transmission of UE 524. This UE-to-UE interference is shown by line 550.

As will be appreciated by those in the art, the two interference scenarios described in FIG. 5 may be avoided if a cell and its neighbor cells are using the same TDD UL/DL configurations or if there is enough isolation between cells 510 and 512. However, with emerging schemes on dynamic TDD UL/DL configuration change for traffic adaptation, the TDD UL/DL configuration change may be done in a fast rate and may also be done relatively independently from neighbor cells as the traffic pattern or interference situation is likely cell-specific.

This means that the likelihood of having different TDD UL/DL configurations in neighbor cells may increase. In this case, the eNB-to-eNB interference and UE-to-UE interference may potentially appear in subframes designated for opposite link directions across cells.

Figure 6:
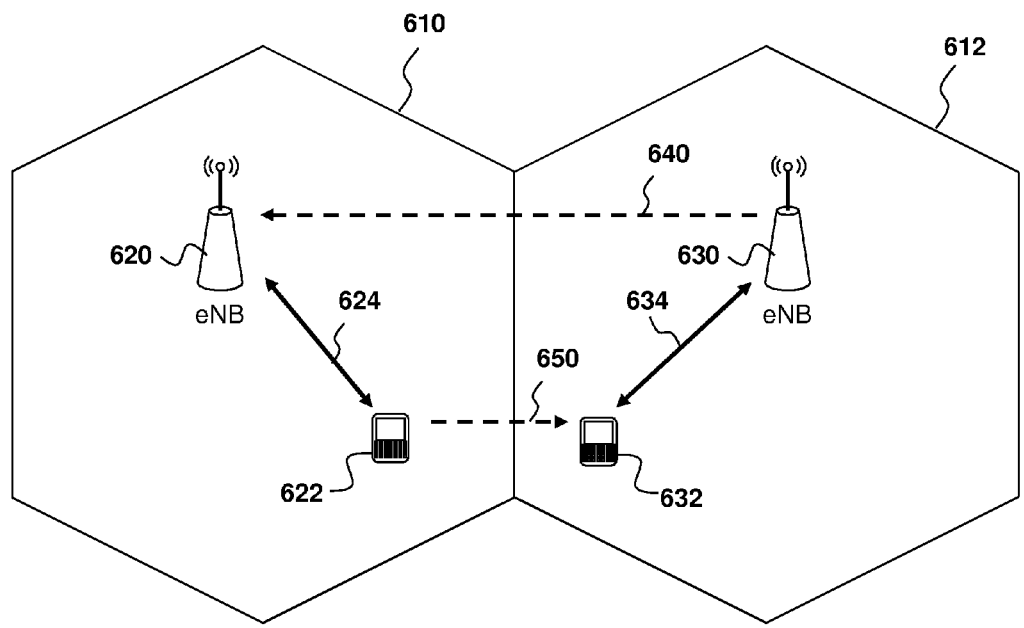
FIG. 6 is a block diagram showing an example of neighboring cells using TDD UL/DL configurations 0 and 1 and causing UE-to-UE and eNB-to-eNB interference in subframes 4 and 9.

Reference is now made to FIG. 6, which shows a first cell 610 and a second cell 612. A communication link between an eNB 620 and UE 622 in cell 610 is shown with reference numeral 624.

Similarly, a communication link between an eNB 630 and UE 632 is shown with reference numeral 634 in cell 612.

Interference between the cells is shown with reference numeral 640 and interference between the UEs is shown with reference numeral 650.

Further, in the embodiment of FIG. 6, cell 610 has a configuration #0 as shown by Table 660 and cell 612 has a configuration #1 as shown by Table 670. Tables 660 and 670 show the downlink, uplink and special subframes with the letters "D", "U", and "S".

As seen from the comparison between Table 660 and 670, in subframe 4 and subframe 9, cell 610 has an uplink communication link while cell 612 has a downlink communication link. During subframes 4 and 9, eNB-to-eNB and/or UE-to-UE inter-cell interference may occur.

The present disclosure therefore provides for various embodiments for interference mitigation. In a first embodiment, an interference type field may be added in the interference overload indicator (IOI) information element. In a second embodiment TDD UL/DL configuration exchange may occur. Each is discussed below.

Interference Type Field in the IOI Information Element

In one embodiment, an eNB in uplink subframes identifies the type of potential interference from neighbor cells and notifies one or more interfering cells of the interference level so that an interference mitigation plan targeting the specific interference type can be initialized. It is assumed for the embodiments herein that all cells are time synchronized but may not use the same TDD configurations and in accordance with the present embodiment each cell does not know the TDD configurations used by its neighboring cells.

Thus, in accordance with one embodiment, an interference type field is added to an existing interference overload indicator (IOI) information element to differentiate the eNB-to-eNB interference and the UE-to-UE interference from existing uplink UE-to-eNB interference. The presence of eNB-to-eNB interference may be detected based on cell specific reference signals, which may differentiate eNB-to-eNB interference from UE-to-UE interference.

Thus, for the eNB-to-eNB interference, an interfered eNB can send IOI messages to explicitly indicate the presence of eNB-to-eNB interference to the interfering eNB(s). Then, eNBs can take actions for interference mitigation, which includes interfering eNBs reducing the transmit power in the downlink transmission designated subframes that may potentially cause eNB-to-eNB interference. This may imply scheduling the timeslots of non-matched link directions to provide downlink transmissions only for cell-center UEs in the interfering cell and uplink transmissions in the interfering cell, and initiate a frequency-reuse plan between downlink transmissions at the interfering eNB and uplink transmission at the interfered eNB, among other options.

For UE-to-UE interference, an eNB in an interfered cell where UEs suffer from UE-to-UE inter-cell interference from an interfering cell can send an IOI to explicitly indicate the UE-to-UE interference to the surrounding eNBs which contain possible interfering cells. Then the eNBs can take actions for interference mitigation which may include interfering eNBs reducing the transmit power of the UEs in uplink transmissions designated subframes that may potentially cause UE-to-UE interference. Further, the interference mitigation may imply scheduling cell-center UEs for uplink transmissions in the interfering subframes. The cell center downlink transmissions may be scheduled to UEs in the interfered cell and a frequency-reuse plan between uplink transmissions in the interfering cell and downlink transmissions at the interfered cell may be initiated.

In order to provide for interference information in the IOI information element, various factors may need to be identified. These include, but are not limited to, cell identifier identification and interference type identification.

Cell Identification

To facilitate an eNB to detect eNB-to-eNB interference, physical cell identifier information on neighboring cells may be needed. An eNB may acquire the neighbor cell ID information by at least one of the following techniques.

In a first embodiment, the physical cell identifier information may be exchanged through X2 messaging. Thus, an eNB may provide its identification to its neighboring cells through a backhaul interface such as an X2 messaging interface.

In a second embodiment, neighbor cell information may be reported by UEs being served. Thus, cell edge UEs may see downlink signals from neighboring cells and may report the signal strength of the neighboring cells. The reporting of the signal strength of neighboring cells may lead the serving eNB to know the physical cell ID of the neighboring cells.

In a third embodiment, an eNB may occasionally shut down its downlink transmissions at a subframe 0 or a subframe 5, which are always downlink subframes, in order to perform a cell search to check for the presence of neighbor cells. The occasional shut down may occur periodically, such as once per hour, but typically would be selected at a random frame or with an unique offset value in order to avoid all neighboring cells shutting down their downlink transmissions in the same subframe. The eNB would therefore permit additional "UE" functionalities in order to perform a cell search.

From the above, the first embodiment requires an X2 message exchange while the second and third embodiments do not.

Interference Type Identification

Further to cell ID identification, interference type identification may be needed for proper interference mitigation. Both the presence of inter-cell interference and the type of interference may need to be detected.

eNB-to-eNB Interference

Without any knowledge of neighbor cell TDD UL/DL configurations, the detection of potential eNB-to-eNB interference from neighbor cells may be performed in a semi-blind way.

In order to facilitate the discussion below, eNB-to-eNB interference causing subframes are grouped into a set "S1" and subframes where there is no potential eNB-to-eNB interference are grouped into a set "S2". The sets S1 and S2 are dependent on the TDD uplink/downlink configuration and are shown below with regard to Table 2. The uplink/downlink subframe transmission designations in the different TDD configurations are shown above with regard to Table 1.

TABLE 2

DL Subframe sets for cell causing eNB-to-eNB interference

| UL/DL configuration | S1 | S2 |
| --- | --- | --- |
| 0 | { } | {0, 1, 5, 6} |
| 1 | {4, 9} | {0, 1, 5, 6} |
| 2 | {3, 4, 8, 9} | {0, 1, 5, 6} |
| 3 | {6, 7, 8, 9} | {0, 1, 5} |
| 4 | {4, 6, 7, 8, 9} | {0, 1, 5} |
| 5 | {3, 4, 6, 7, 8, 9} | {0, 1, 5} |
| 6 | {9} | {0, 1, 5, 6} |

Thus, as derived from Table 1, in Table 2 UL/DL configuration 0 has no potential for causing any interference in neighboring cells during the uplink subframe in those neighboring cells. This is because the configuration 0 only has two downlink subframes, namely subframes 0 and 5. However, subframes 0 and 5 are always downlink subframes for every configuration and therefore there is no potential for causing interference in neighboring cells having different configurations. Conversely, in UL/DL configuration 5, subframes 3, 4, 6, 7, 8, and 9 all have the potential to cause eNB-to-eNB interference since all of these subframes are downlink subframes in configuration 5, and other configurations have either uplink or special subframes during these subframe numbers.

Referring again to Table 2, in configuration 0 subframes 0, 1, 5 and 6 have no potential for causing eNB-to-eNB interference since these are all either downlink or special subframes and all other configurations have either a downlink or special subframes during these subframes.

However, as seen in Table 2, during configuration 5, the S2 set includes only subframes 0, 1 and 5 since in subframe 6, configuration 5 has a downlink subframe which may cause eNB-to-eNB interference for those configurations having a special subframe during subframe #6.

Thus, in one embodiment, eNB-to-eNB interference identification may be based on cell-specific reference signals of neighboring cells. Based on the possible TDD UL/DL configurations tabulated in Table 2 above, for a given cell the potential eNB-to-eNB interference can occur only in a subframe designated as an uplink subframe by the cell, and further in a subframe from the set {3,4,6,7,8,9}. Those subframes are then grouped into a set S_det_1, which is shown in Table 3 below for different TDD UL/DL configurations.

TABLE 3

Subframe sets for cell detecting eNB to eNB interference

| UL/DL Configuration | S_det_1 |
| --- | --- |
| 0 | {3, 4, 6, 7, 8, 9} |
| 1 | {3, 6, 7, 8} |
| 2 | {6, 7} |
| 3 | {3, 4} |
| 4 | {3} |
| 5 | { } |
| 6 | {3, 4, 6, 7, 8} |

Table 3 above shows the subframes in which a particular eNB may be interfered with by other cells. Thus, if the eNB is in a TDD configuration 0, it may be interfered with in subframes 3, 4, 6, 7, 8, and 9 with eNB-to-eNB inter-cell interference.

The detection of interference may also be based on the correlation of the received signals with locally generated cell specific reference signals according to neighbor cell identifiers and the subframe index.

Thus, if the correlation for a given neighbor cell ID exceeds a threshold in a subframe having potential eNB-to-eNB interference, the eNB may identify that there is an eNB-to-eNB interference from the neighbor cell to the present cell during that subframe.

Figure 7:
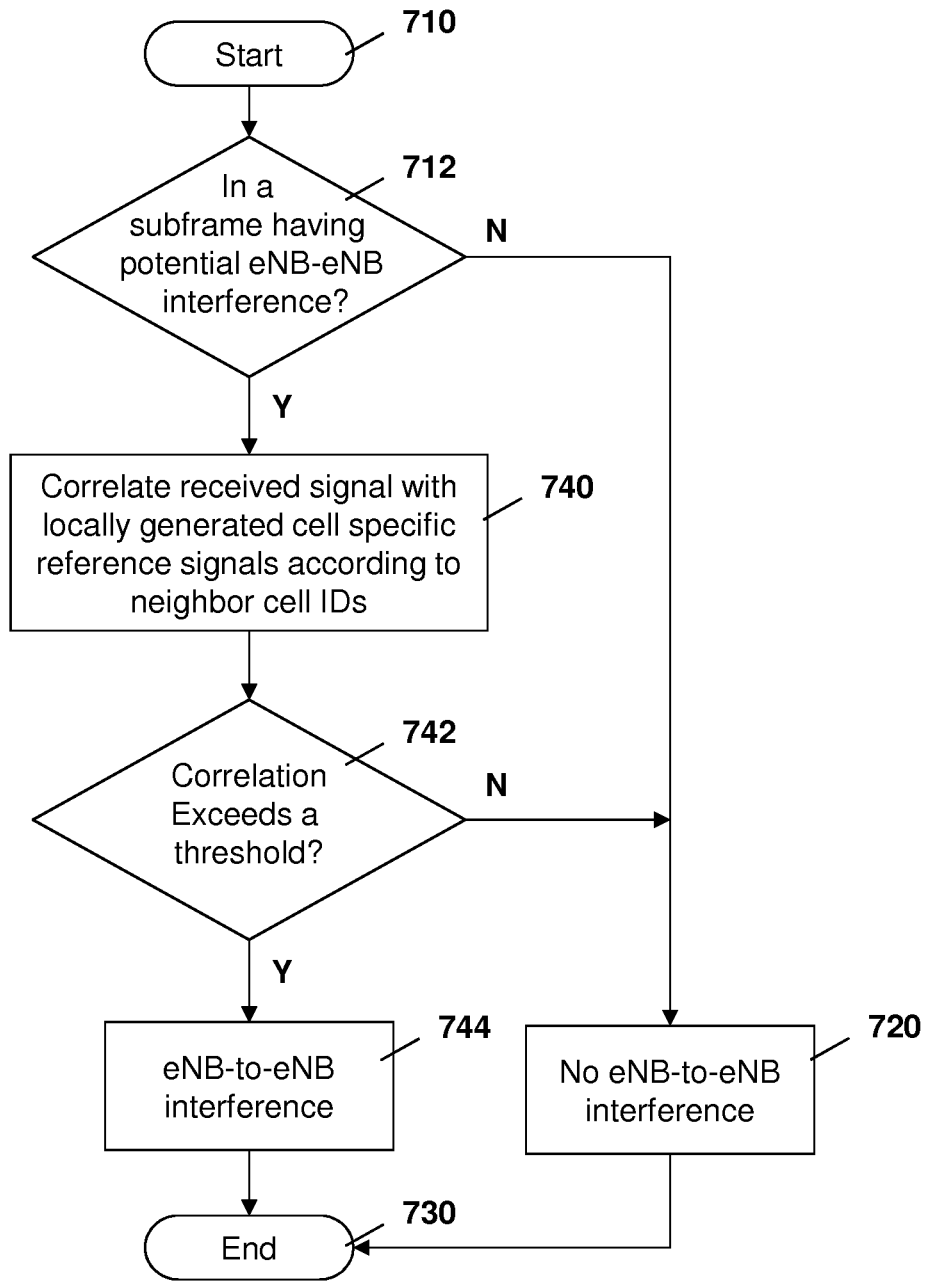
FIG. 7 is a process diagram showing an example of an eNB detecting eNB-to-eNB interference.

The above is shown with reference to FIG. 7. Specifically, FIG. 7 shows a process which starts at block 710 and proceeds to block 712 in which a check is made to determine whether the subframe has potential eNB-to-eNB interference. As indicated above, the check uses Table 3 to make the determination.

If the subframe has no potential eNB-to-eNB interference the process proceeds to block 720 in which no eNB-to-NB interference is identified and the process then proceeds to block 730 and ends.

Conversely, if the check at block 712 determines that the subframe has potential eNB-to-eNB interference, the process proceeds to block 740. At block 740 the process correlates a receipt signal with a locally generated cell specific reference signal according to neighbor cell identifiers, as described above.

From block 740 the process proceeds to block 742 in which a check is made to determine whether the correlation exceeds a threshold. If no, the process proceeds to block 720 in which no eNB-to-eNB interference is identified.

Conversely, if the check at block 742 determines that the correlation exceeds the threshold then the process proceeds to block 744 in which eNB-to-eNB interference is identified for the subframe.

From block 744 the process proceeds to block 730 and ends.

In some embodiments, the Relative Narrowband Transmit Power (RNTP) information on the neighbor cells may also be helpful in identifying the eNB-to-eNB interference. However, the embodiments described herein are based on cell-specific reference signals of neighbor cells, which can be performed in some cases without any RNTP information.

UE-to-UE Interference

Two embodiments are described below with regard to detecting UE-to-UE interference. In a first embodiment, the eNB detects UE-to-UE interference and in the other embodiment the UEs themselves detect UE-to-UE interference.

With regard to an eNB detecting UE-to-UE interference, an eNB can indirectly detect such interference by comparing the NAK rate of the ACK/NAKs responding to downlink transmissions and subframes that may be affected by UE-to-UE interference with the NAK rate of ACKs/NAKs responding to downlink transmissions and subframes that are never affected by UE-to-UE interference.

In particular, for a cell, the potential UE-to-UE interference can occur in a cell only in subframes designated as downlink in the subframe set {3,4,6,7,8,9}. The specific subframes that may have potential UE-to-UE interference are illustrated above with regards to in Table 3.

In subframe 6, this subframe may be a special subframe in accordance with Table 1, and in this case only the last two OFDM symbols may be potentially interfered by UE-to-UE interference for UL/DL configuration 3, 4 and 5. As such interference is not likely to be as severe as in the normal cases of uplink subframes, in some embodiments such interference may be dealt with as described below with regard to the collision of downlink of subframes with special subframes.

If UE-to-UE interference potentially affected subframes are grouped into a set "S3", and unaffected subframes are grouped into group "S4", the consequence is that S3=S1 and S4=S2 as UE-to-UE interference and eNB-to-eNB interference occur simultaneously but in different cells. The UE-to-UE interference from neighbor cells to the interfered cells occurs in the subframe from the set S1 when the subframe is designated as downlink in the cell, while eNB-to-eNB interference from neighbor cells to the interfered cell occurs in a subframe from the set S1 when the subframe is designated as uplink in this cell. The sets S1 and S2 are provided above with regard to Table 2.

Based on the above, a calculation can occur for subframes from the set S1 utilizing all of the ACK/NAK responses to calculate a NAK_RATE1. In particular, the calculation may be as follows:

$$NAK\_RATE1=NAK/(Total\ ACK+NAK) \qquad (1)$$

From the above, NAK_RATE1 calculates the ratio of NAKs to the total ACKs plus NAKs to obtain a percentage of signals that are a NAK in subframes from the set S1.

Similarly, the ACK/NAK responding to downlink transmissions in subframes from the set S2 will be used to calculate a NAK_RATE2. In particular, the calculation is as follows:

$$NAK\_RATE2=NAK/(Total\ ACK+NAK) \qquad (2)$$

From the above, the NAK_RATE2 is equal to the percentage to the total ACKs+NAKs in the subframes associated with set S2.

In some embodiments, not all subframes in the set S1 may be affected by UE-to-UE interference. In this case, a NAK_RATE1(n) for each subframe n in a set S1 may be calculated and that a maximum NAK_RATE1 equals max {NAK_RATE1(n), n in S1} is selected.

If the NAK_RATE1 is much larger than the NAK_RATE2, the eNB may claim that subframes in the set S1 may experience UE-to-UE interference as downlink transmission in those subframes were not successfully received by the UEs.

Further, the NAK rates can in some embodiments be calculated over a time duration preconfigured through higher layer signaling.

Thus, in accordance with the above, the eNB can infer UE-to-UE interference based on the NAK ratios of potentially affected subframes versus unaffected subframes.

Figure 8:
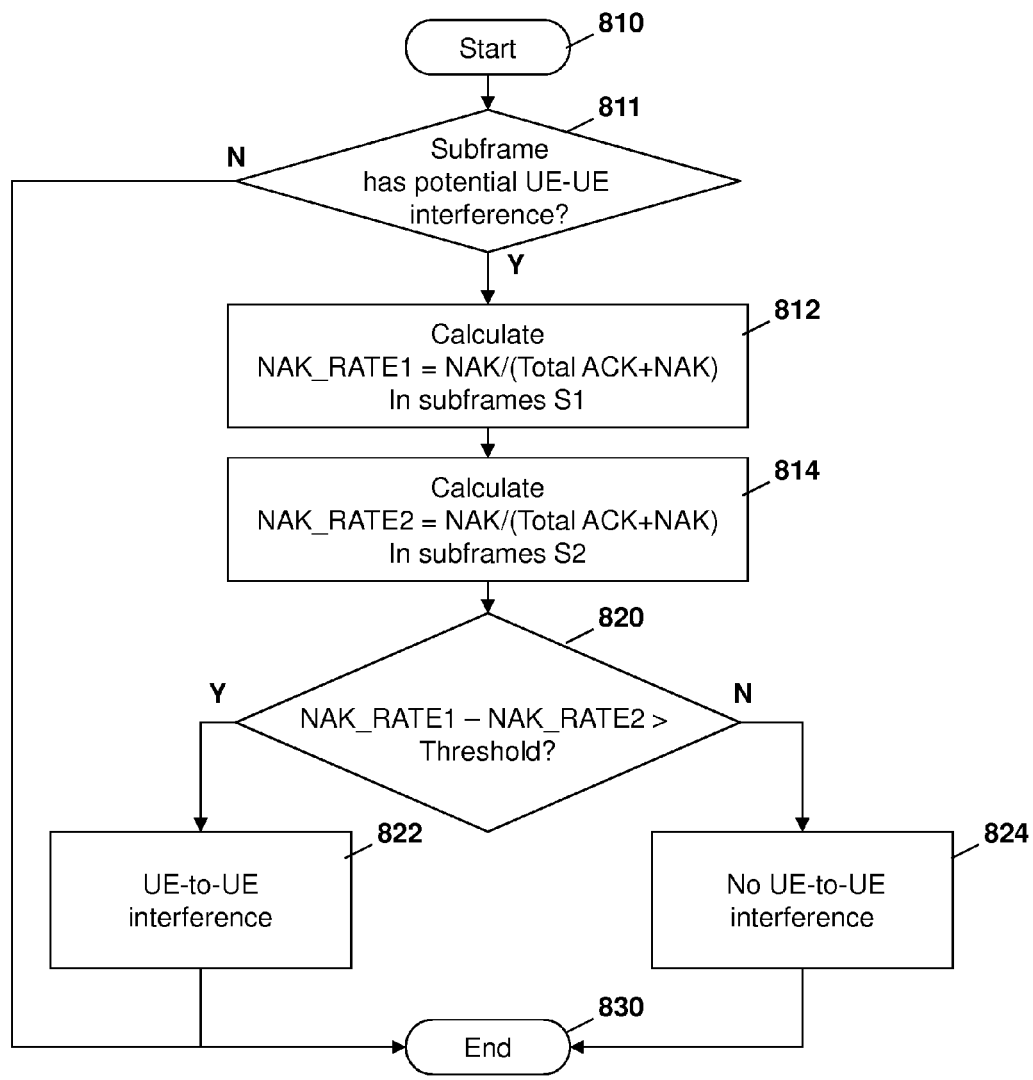
FIG. 8 is a process diagram showing an example of an eNB detecting UE-to-UE interference.

Reference is now made to FIG. 8, which shows an example process at an eNB for identifying UE-to-UE interference. Specifically, the process of FIG. 8 starts at block 810 and proceeds to block 811 in which a check is made to determine if the subframe potentially can be affected by UE-to-UE interference. The check determines if the subframe is designated as a downlink and the cell is in a subframe of the set {3,4,6,7,8,9}. If no, the process proceeds to block 830 and ends.

Conversely, if there is potential UE-to-UE interference, the process proceeds to block 812 in which the eNB calculates the NAK_RATE1 in accordance with equation 1 above.

The process next proceeds to block 814 in which the NAK_RATE2 is calculated by the eNB in accordance with equation 2 above.

The process next proceeds to block 820 in which a check is made to determine whether the difference between NAK_RATE1 and NAK_RATE2 exceeds a threshold. If the difference exceeds a threshold then the process proceeds to block 822 in which UE-to-UE interference is identified for the subframe. Conversely, if the difference does not exceeds the threshold then the process proceeds from block 820 to block 824 in which no UE-to-UE interference is identified for the subframe.

From blocks 822 and 824 the process proceeds to block 830 and ends.

In a further embodiment, the UE itself may detect UE-to-UE interference. In particular, in subframes from set S1 of Table 2 above, strong UE-to-UE interference may occur to a UE. This may happen to a UE even when the UE is considered to be away from neighboring eNBs as cell-edge UEs in neighboring cells may use high transmit power for uplink transmissions, resulting in strong UE-to-UE interference.

In one embodiment, a UE may detect UE-to-UE interference even when there is no TDD UL/DL configuration information regarding neighboring cells. Assuming that the UE has no such knowledge of the TDD UL/DL configuration used by the neighboring cells, the UE may perform the UE-to-UE interference detection in accordance with the following.

The UE may first track the downlink channel impulse response (CIR) from the serving eNB to the UE. This CIR is tracked or updated in the downlink subframes.

The UE may then estimate the received total (RX_PWR_TOTAL) power (per resource block). This power includes noise, interference, and signal powers.

The UE may further compute a rise-over-thermal (ROT) interference power. The rise-over-thermal power in a specific subframe that can be averaged over subframes with the same subframe index. Thus, for a subframe n, we have:

$$RX\_PWR\_ROT(n) = RX\_PWR\_TOTAL(n) - PWR\_NOISE - RX\_PWR\_RS(n) \quad (3)$$

In equation 3 above, the PWR_NOISE is a noise power reference, which can be computed based on the thermal noise floor plus a UE noise figure. The noise floor, may, for example be calculated as −174 dBm/Hz+10 log 10 (frequency portion of interest in Hz). The UE noise figure is typically a value in dB and may for example be 6 dB. A more accurate value for individual UE may be available from manufacturing calibrations.

From equation 3 above, the RX_PWR_RS (n) is the received reference signal (RS) power scaled for the resource block (RB).

The UE may further average the ROT interference power based on a subframe set S1 and S2. However, in some cases the UE may not use all PDSCH RBs because some RBs might be allocated to other UEs. Further, PDSCH RBs might use a power different from the power used for the reference signal due to the downlink power allocation configuration. Further, the downlink power allocation parameter in general does not change quickly and the presence of UE-to-UE interference can happen only in subframes of set S1 from Table 2 above.

Based on the above, the average of the RX_PWR_ROT over the subframes of set S2 would indicate the downlink power reference is not affected by UE-to-UE interference. This may be expressed in accordance with equation 4 below.

$$RX\_DL\_PWR\_REF\_ROT = \text{average}(RX\_PWR\_ROT) \text{ over DL only subframes (set } S2) \quad (4)$$

Thus the received downlink power reference rise over thermal is provided as the average received power rise over thermal over downlink only subframes, i.e. set S2.

The difference between the RX_PWR_ROT(n) for n in the set of S1, this would indicate that the presence of potential UE-to-UE interference. This difference is defined in equation 5 below.

$$RX\_PWR\_ROT\_DIFF = \max\{RX\_PWR\_ROT(n) - RX\_DL\_PWR\_REF\_ROT\} \quad (5)$$

From equation 5 above, the difference is calculated as the maximum of the rise over thermal power for a given subframe "n", minus the reference rise over thermal.

It is also possible to use the average operation instead of the maximum operation in computing the RX_PWR_ROT_DIFF.

If the RX_PWR_ROT_DIFF is larger than a threshold, the UE may claim that there is UE-to-UE interference and may further determine the interference overload indicator (IOI) and send it back to the eNB.

As with the above embodiments, the threshold may be defined by a manufacturer, within standards, or signaled to the UE, among other possibilities.

Figure 9:
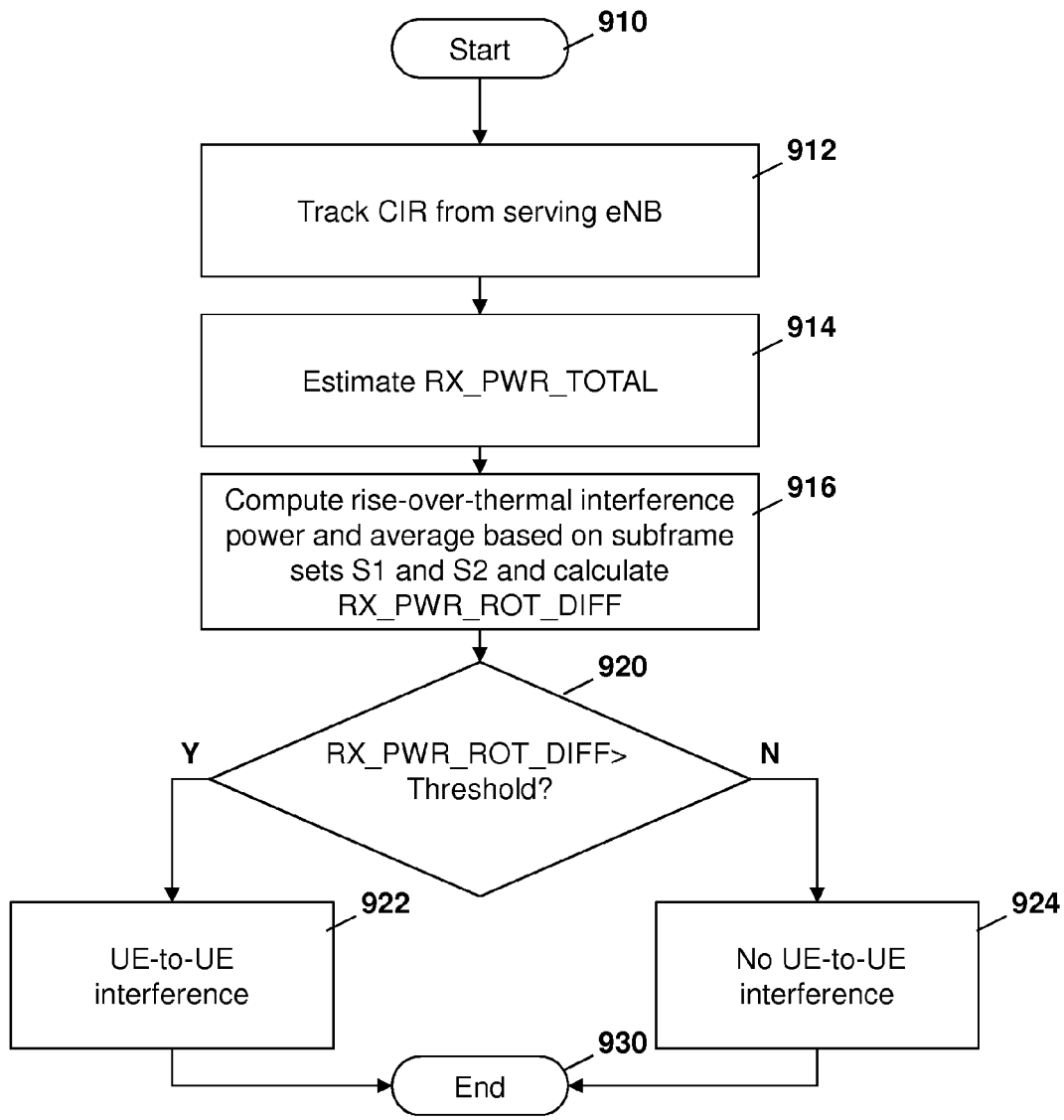
FIG. 9 is a process diagram showing an example of a UE detecting UE-to-UE interference.

Reference is made to FIG. 9, which shows a process at a UE for determining UE-to-UE interference. Specifically, the process starts at block 910 and proceeds to block 912 in which the UE tracks the channel impulse response of the serving eNB.

The process then proceeds to block 914 in which the total received power is estimated.

The process then proceeds to block 916 in which the rise-over-thermal interference power and average is computed based on subframe sets S1 and S2. The rise-over-thermal interference power and average for each of the subsets is used to calculate a received power rise-over-thermal difference as provided in equation 5 above.

From block 916, the process proceeds to block 920 in which a check is made to determine whether the received power rise-over-thermal difference exceeds a threshold. If yes, the process proceeds to block 922 in which UE-to-UE interference is identified for the subframe. If no, the process proceeds to block 924 in which no UE-to-UE interference for the subframe is identified.

From blocks 922 and 924, the process proceeds to block 930 and ends.

Alternatively, the UE may know the configuration of the TDD UL/DL for neighboring cells. In some embodiments UEs may acquire the TDD configuration used by neighboring cells. The frequency of neighbor cell UL/DL configuration acquisition may depend on how often the UL/DL configuration changes are required for certain deployment scenarios. The acquisition rate may be semi-statically configured through higher layer signaling in some embodiments.

Basically, a UE at a cell-edge can see downlink signals from its serving cell and at least one neighbor cell. In this case, the UE may suffer from UE-to-UE interference. Thus, when the TDD UL/DL configuration information is broadcast via the physical downlink control channel (PDCCH) in a common search space, the UE, in addition to decoding the PDCCH of the serving cell, may decode the PDCCH in the common search space from the neighbor cell to acquire the TDD UL/DL configuration used by the neighbor cell. In this case, the UE may know the TDD UL/DL configurations of the serving cell and the neighboring cells and may identify the DL/UL subframes within which potential UE-to-UE interference may arise. The UE may then perform the UE-to-UE interference detection in those subframes only. Those subframes are the ones designated as downlink subframes by the serving cell but as uplink subframes by at least one neighbor cell.

The detection of the UE-to-UE interference may be limited to the specifically identified subframes, and may use the embodiments of FIG. 9 with the further knowledge of the potential subframes in which the UE-to-UE interference may occur.

In comparing the approaches between the eNB detecting the UE-to-UE interference indirectly and the UEs detecting the UE-to-UE interference, the UE performing the detection is therefore a direct detection approach. However, when the UE is performing the detecting, the UE then needs to feedback to the eNB such UE-to-UE interference overload indicator (IOI). This may increase uplink resources needed for the UE.

In order to reduce such need for uplink resources to feed back the IOI, the UE has various options. In one embodiment, the UE may feedback the IOI for an entire band only and on an as-needed basis. Further, in some embodiments, the eNB may identify several UEs that frequently send back NAKs in response to downlink transmission in subframes of set S1 and instruct these UEs to feedback the IOI for UE-to-UE interference, thus preventing all of the UEs in the cell from providing the IOI feedback.

Downlink eNB-To-UE Interference

There are many methods to detect potential downlink eNB-to-UE interference. Examples include the fact that each eNB knows the expected mean (average) serving-cell reference signal received power (RSRP) for its cell-edge UEs from the neighboring cell deployment. Each eNB may further check the RSRP reporting on neighbor cells from cell-edge UEs. If the difference between the mean serving-cell RSRP and the reported neighbor-cell RSRP from a cell-edge UE is less than a threshold, the eNB may classify the UE as one potentially affected by downlink eNB-to-UE interference (from the neighbor cell to the UE). The RSRP measurement by the UE could be done in subframes designated as downlink subframes by the serving cell.

Alternatively, the RSRP measurement by the UE could be in the same subframes 0, 1, 5, 6 as full or partial time portions of those subframes are designated for downlink transmissions across cells.

Each UE in a cell can check its rise-over-thermal interference power in the subframes designated as downlink subframes by a serving cell or in subframes 0, 1, 5, 6 only, for example.

Uplink UE-To-eNB Interference

Similar to downlink eNB-to-UE interference, uplink UE-to-eNB interference has various techniques for detection. One simple method may be to check the rise-over-thermal interference power at the eNB. In the subframes found in Table 3 above, both eNB-to-eNB interference and uplink UE-to-eNB interference may be present. A simple rule to differentiate between the two types of interference may be that interference detected in subframes of S_det_1 may be identified as uplink UE-to-eNB interference if no correlation between the received signals and neighbor-cell reference signals exceeds a threshold. Uplink interference detected in subframes other than those of S_det_1 may be identified as uplink UE-to-eNB interference.

IOI Information Element

Once the interference is detected and identified, the information may be provided in an interference overload indicator information element. The provision may be through an X2 interface or other backhaul interface and may be sent to interfering neighboring cells on an as-needed basis. In this case, to further differentiate the eNB-to-eNB interference and the UE-to-UE interference from the UE-to-eNB interference, an additional field may be added to the IOI IE. Reference is now made to Table 4.

TABLE 4

Interference Overload Indicator IE

| IE/Group Name | Presence | Range | IE type and reference | Semantics description |
|---|---|---|---|---|
| Interference type | O | | Enumerated (UE-to-eNB, eNB-to-eNB, UE-to-UE, eNB-to-UE interference) | For dynamic TDD UL/DL configuration change. 2 bits in length |
| UL Interference Overload Indication List | | 1 to <maxnoofPRBs> | | |
| >UL Interference Overload Indication | M | | ENUMERATED (high interference, medium interference, low interference, . . .) | Each PRB is identified by its position in the list: the first element in the list corresponds to PRB 0, the sectod to PRB 1, etc. |

Thus, in accordance with Table 4 above, an interference type field is added to the information element. The presence of the field is optional, as indicated in Table 4 above, and the information element may provide an enumerated value to indicate the type of interference, whether UE-to-eNB, eNB-to-UE, UE-to-UE or eNB-to-eNB.

In accordance with Table 4, the implementation is a single parameter for all physical resource blocks. However, in other embodiments the indicator may be implemented on a per physical resource block basis by moving the field to the bottom of the table. This however may lead to an increase in message size.

The IOI IE is sent through a backhaul and may use X2 messaging. The IOI IE is interference specific and is sent independently on an as-needed basis only. Furthermore, it is possible to include a cell identifier parameter in the report when the interfering source is from an eNB. In this way, the exact source of interference may be identified making it is easier for interference mitigation. Alternatively, the IOI IE is only sent to the interfering eNB in some embodiments. Other possibilities exist.

Two embodiments of the above interference overload indicator IE may be summarized in accordance with the following.

The last parameter in Table 4 may be limited to uplink interference overload indication. This may be applicable for all four types of interference. Alternatively, two separate IEs may be provided based on the same source of interference. In other words, eNB and UE. In this embodiment, the interference type parameter may only require one bit. Furthermore, for interfering eNB cases, the Cell ID may be added to better identify the interference source.

Once an eNB receives an IOI IE over an X2 backhaul, the eNB may take actions to mitigate interference. Various interference mitigation schemes are described above for UE-to-eNB and eNB-to-UE interference. Thus, the embodiments below focus on mitigation of eNB-to-eNB interference and mitigation of UE-to-UE interference. In some cases, the interference mitigation schemes further include adjustments on the uplink/downlink configuration in order to avoid severe interference situations.

eNB-To-eNB Interference Mitigation

Various techniques are provided herein for mitigating eNB-to-eNB interference.

In one embodiment, the interfering eNB may reduce the transmit power in subframes of set S1 from Table 2 above. Such power reduction may imply the scheduling of downlink transmissions for cell-center UEs in the interfering cell, since the power in such subframes is lower and thus cell-center UEs have a better chance of receiving such subframe than those on the cell edge.

Further, in another embodiment, the interfered eNB may schedule cell-center UEs in subframes of set S_det_1 of Table 3 above. Such cell-center UEs may transmit at a power high enough to overcome any residual eNB-to-eNB interference.

Further, if the interference type is eNB-to-eNB, the interfering eNB and interfered eNB may initiate a frequency reuse plan. Here, the frequency reuse plan is between a downlink subframe at the interfering eNB and an uplink subframe at the interfered eNB.

Since the eNBs do not know the TDD configurations of their neighbor cells, the frequency reuse is done in a conservative manner. Basically, the frequency reuse is done by the interfering eNB in a subframe of set S1 from Table 2 above, while the frequency reuse is done by the interfered with eNB in subframes of set S_det_1 in Table 3 above.

The frequency reuse plan, however, may not be able to resolve the interference caused by cell-specific reference signals. As a result, interference cancellation schemes may be used in subframes of set S_det_1. For remaining interference corresponding to the control regions, the interfered eNB may use conservative low-order modulation coding schemes to schedule UE uplink transmissions in order to combat the remaining interference.

UE-To-UE Interference Mitigation

Various techniques are provided herein for mitigating UE-to-UE interference. In a first embodiment, the eNB in an interfering cell may reduce the transmit powers of the scheduled UEs, especially those near the cell-edge, in subframes of set S_det_1 from Table 3 above. This implies that the eNB of the interfering cell will likely schedule uplink transmissions for cell-center UEs in those subframes so that the UEs may introduce less UE-to-UE interference to UEs in neighboring cells.

In a further embodiment, the eNB in an interfering cell may schedule cell-center UEs in subframes of set S1 so that UEs receiving downlink data could be away from the cell-edge and the degree of UE-to-UE interference to those UEs may be less, while UEs suffering more from UE-to-UE interference are not scheduled to receive downlink data in those subframes.

Further, in another embodiment, the eNBs may initiate a frequency reuse plan. The frequency reuse done by the eNB in the interfered cell will be the subframes set S1 from Table 2 above, while the frequency reuse done by the interfering eNB will be in the subframes of set S_det_1 from Table 3 above.

TDD UL/DL Configuration Exchange

In a further aspect of the present disclosure, the above solutions would be applicable except that TDD UL/DL configuration information is further exchanged among eNBs. As such, the particular DL/UL subframes affected by the eNB-to-eNB interference or the UE-to-UE interference can further be determined and the set of those identified subframes is much less than the set S1 or S_det_1 used in the previous embodiments.

As with the embodiments described above, the cell identifier may be obtained at an eNB for neighboring cells. The techniques described above with regard to exchange of cell identifiers through the backhaul, through detection, or through reporting by the UE can be equally applicable to the embodiments herein.

If the TDD UL/DL configuration information is exchanged between network cells, the exchange may be done through X2 messaging over backhaul for example. In one embodiment, considering the backhaul delay, TDD UL/DL configuration may be exchanged for a future TDD configuration. It may be sent at least a time designated as "d" earlier than a future TDD configuration period boundary. "d" is chosen so that it is larger than the worst case backhaul delays between those eNBs. For fast TDD UL/DL configuration changes this means that a fast backhaul may be needed.

Currently, TDD UL/DL configuration information is embedded in the Served Cell Information IE with many other parameters. One may trigger this existing Served Cell Information IE whenever there is a TDD UL/DL configuration change. However, this may not be efficient if the UL/DL configuration changes are frequent and in this regard, in one embodiment the present disclosure provides a separate TDD UL/DL configuration IE. Reference is now made to Table 5, which shows an example TDD UL/DL configuration IE.

TABLE 5

Example TDD UL/DL configuration IE

| IE/Group Name | Presence | Range | IE type and reference | Semantics description |
|---|---|---|---|---|
| Subframe Assignment | M | | Enumerated (sa0, sa1, sa2, sa3, sa4, sa5, sa6, . . .) | Uplink-downlink subframe configuration information defined in ref. TS 36.211 |

As seen in Table 5 above, an enumerated subframe assignment chosen from among the seven enumerated configurations in the 3GPP TS 36.211 Specifications is provided. The X2 message thus only requires 3 payload bits to provide the information.

Interference Identification

For interference type identification, the embodiments described above could be used when TDD UL/DL configuration exchange occurs. If TDD UL/DL exchange occurs, the interference identification may be more targeted to the particular subframes between the two cells in which actual eNB-to-eNB or UE-to-UE interference may occur.

In other words, the check for the interference type may be limited to those subframes where the serving eNB and the neighboring eNB have opposite link directions. Those subframes could easily be identified based on known TDD UL/DL configurations of neighbor cells and because of that, interference type identification at the eNB may be easier than in the above solutions having no knowledge of neighboring cell configurations.

Figure 10:
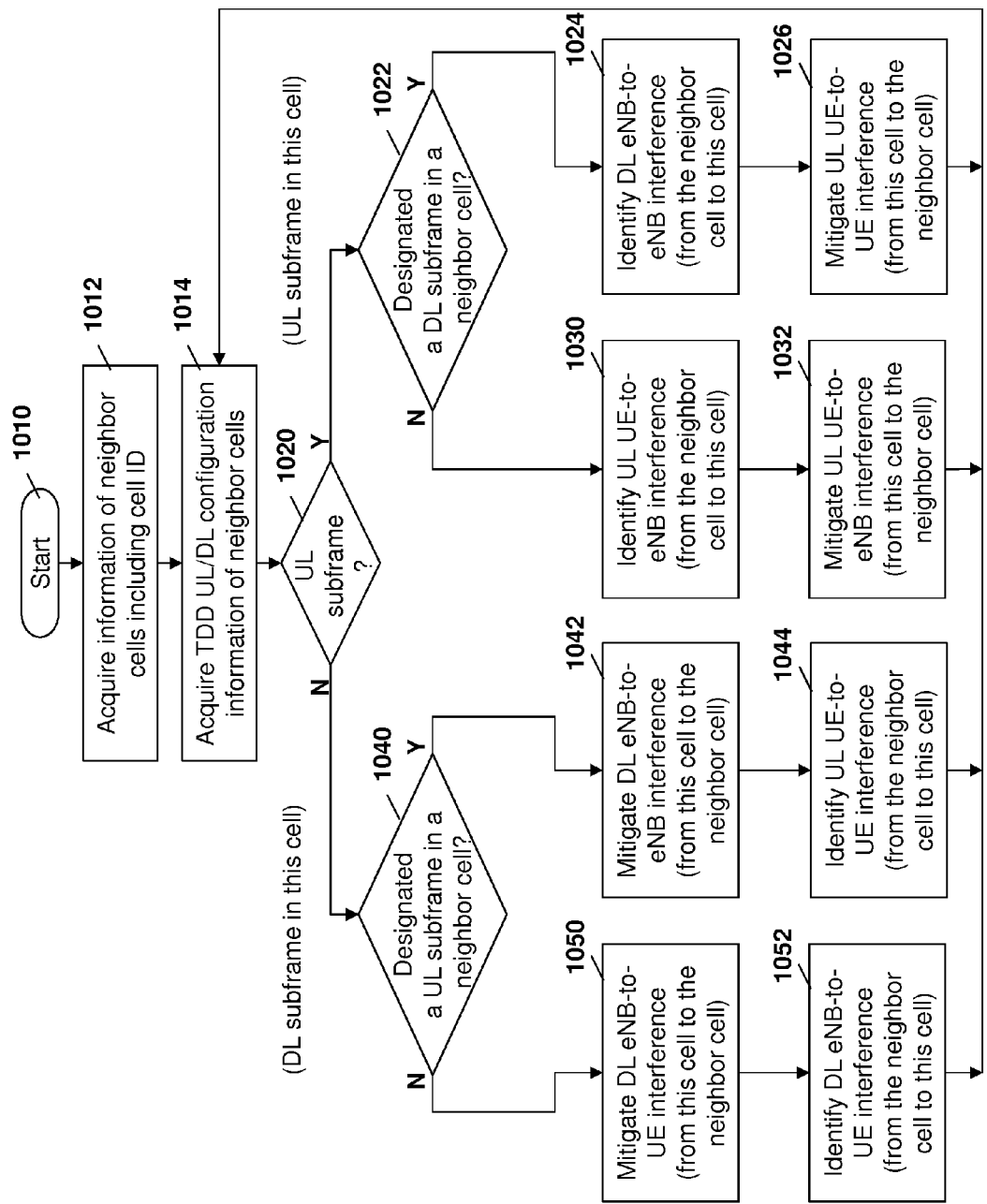
FIG. 10 is a process diagram showing an example of a eNB with neighboring cell configuration knowledge detecting interference.

Reference is now made to FIG. 10. The process of FIG. 10 starts at block 1010 and proceeds to block 1012 in which an eNB acquires information about neighboring cells including at least the cell identifier.

The process then proceeds to block 1014 in which the eNB acquires information about the neighboring cell TDD UL/DL configurations including any changes that have occurred.

The process then proceeds to block 1020 in which a check is made to determine whether or not the current subframe is an uplink subframe. If the current subframe is an uplink subframe the process then proceeds to block 1022 in which the eNB further checks to determine whether the subframe is designated as a downlink subframe in a neighbor cell.

If the check at block 1022 determines that the neighbor cell has a downlink subframe then this may give rise to an eNB-to-eNB interference. Therefore, the eNB in the current cell identifies potential eNB-to-eNB interference from the neighbor cell to the present cell. This is shown with block 1024 in the embodiment of FIG. 10 and may use the techniques described above with regards to FIG. 7, for example.

In addition, the uplink subframe from the present cell may give rise to UE-to-UE interference affecting the downlink reception in the neighbor cell. Thus, once the neighbor cell indicates the degree of UE-to-UE interference, the present eNB may need to mitigate the UE-to-UE interference, shown at block 1026. Such mitigation may employ the techniques described above.

From block 1026 the process then proceeds to block 1014 to again acquire possible changes in TDD UL/DL configurations.

From block 1022, if the neighbor cells have not designated a downlink subframe then the neighbor cell has an uplink subframe and the process proceeds from block 1022 to block 1030. At block 1030 any uplink UE-to-eNB interference is identified from the neighboring cell and at block 1032 mitigation may occur for uplink UE-to-eNB interference from the present cell to its neighboring cells. From block 1032 the process then proceeds to block 1014 to again acquire possible changes in TDD UL/DL configurations.

From block 1020, if the present frame is not an uplink subframe, the process then proceeds to block 1040 in which the present subframe is identified as a downlink subframe. At block 1040 a check is made to determine whether any of the neighboring cells have the subframe designated for uplink. If yes, the process proceeds to block 1042 in which the downlink subframe from the present cell may give rise to eNB-to-eNB interference in the neighbor cell. Therefore, when notified, the eNB in the present cell may need to mitigate potential eNB-to-eNB interference from the cell to the neighbor cell as shown by block 1042.

In addition, from block 1042 the process proceeds to block 1044 in which the downlink subframe of the present cell may suffer from UE-to-UE interference from the neighbor cell. This means that if the eNB in the present cell may need to identify UE-to-UE interference from neighbor cells in the present cell. From block 1044 the process then proceeds back to block 1014 to check for possible TDD UL/DL configuration changes in neighboring cells.

From block 1040, if the neighbor cells do not have a subframe designated as an uplink subframe then the process proceeds to block 1050. At block 1050 all cells are downlink transmissions and therefore, when notified, the eNB needs to mitigate potential downlink eNB-to-UE interference from this cell to neighboring cells. Further, the process proceeds to block 1052 in which the eNB may identify downlink eNB-to-UE interference from the neighbor cell to the present cell.

From block 1052 the process proceeds back to block 1014 to acquire any possible neighbor cell TDD UL/DL configuration changes.

The interference detection schemes provided for the present embodiment are similar to those provided above. However because of the known TDD UL/DL configuration of neighbor cells, the interference type in each subframe is clear as shown with regard to the example of FIG. 10. Further, a rise-over-thermal (ROT) interference power based eNB-to-eNB interference detection can be used by an eNB in the uplink subframe if the same subframe is designated as a downlink subframe by all neighbor cells. In this case, the eNB can estimate the total interference plus noise power by measuring the orthogonal frequency division multiplexing (OFDM) symbol power of the uplink resource elements carrying uplink demodulation reference signals (DMRS) and subtracting the contribution from the uplink DMRS or directly measuring the received subframe power at the uplink RBs not allocated for uplink transmissions.

The eNB can then estimate the ROT interference power by subtracting the thermal noise power from the total interference plus noise power. The thermal noise power can be directly computed based on the receiver noise temperature and the receiver noise figure.

The ROT interference power could be only from the contribution of DL eNB interference from neighbor cells as all neighbor cells are using the subframe for downlink transmissions.

In one embodiment, the above detection method may not be used if the same subframe is also designated as an uplink subframe by at least one neighbor cell as in that case the ROT interference power could be from the eNB-to-eNB interference as well as from uplink UE-to-eNB interference. The eNB may need to rely on the correlation of the received signal with the cell specific signals of neighbor cells as described above to determine the presence of any eNB-to-eNB interference.

The sharing of the interfering information may be done utilizing the IOI information element as described above. Further, interference mitigation methods may be the same as those described above.

Other Considerations

Collision of Downlink Subframe with a Special Subframe

If two adjacent cells have different switch periodicities, for example one with 5 ms and the other with 10 ms, there may be a downlink subframe conflicting with the special subframe. In this case, possible interference mitigation methods include dividing all cells into two groups, one with 5 ms switch periodicity and the other with 10 ms switch periodicity.

In addition, a second method for interference mitigation may be to stop downlink transmission during the last one or two OFDM symbols in the special subframe.

Backward Compatibility

Legacy UEs not implementing the embodiments above may listen to the System Information Block Type1 (SIB1) message for a potential TDD UL/DL configuration changes and therefore may not be aware of the current TDD UL/DL configuration change. For those UEs, the eNB can still schedule the UE for uplink or downlink transmissions provided that the anticipated transmission of the ACK/NAK feedback information falls into an uplink subframe under the dynamic TDD UL/DL configurations. In other words, the ACK/NAK feedback does not fall into a subframe with opposite transmissions between TDD UL/DL configurations.

Also, the scheduling may be done provided that the anticipated transmission of the physical hybrid automatic repeat request (HARQ) indicator channel (PHICH) falls into a downlink subframe with PHICH resources under the dynamic TDD UL/DL configuration. For example, a legacy UE may think that it is in TDD UL/DL configuration 0 while the current TDD UL/DL configuration is 1. In this case, the eNB may still schedule that UE but may need to ensure that in any case there will be no transmissions needed to or from the UE in subframe 4 or 9. The impact on the dynamic TDD UL/DL configuration is that a decision on which TDD UL/DL configuration to use in a future frame may need to be made earlier so that when the eNB schedules a legacy UE, the eNB knows if the corresponding ACK/NAK information or PHICH information can be accommodated.

The eNB may also configure TDD UL/DL configurations to use existing system information modification schemes understood by legacy UEs in order to facilitate the scheduling for legacy UEs.

Application to Small Cells

In the case of the heterogeneous network deployment scenario where a macro-cell has multiple small cells such as that shown with regard to FIG. 11 below, each small cell can use different TDD UL/DL configurations. The interference between the small cells and the macro cell may be mitigated using the solutions described above.

Figure 11:
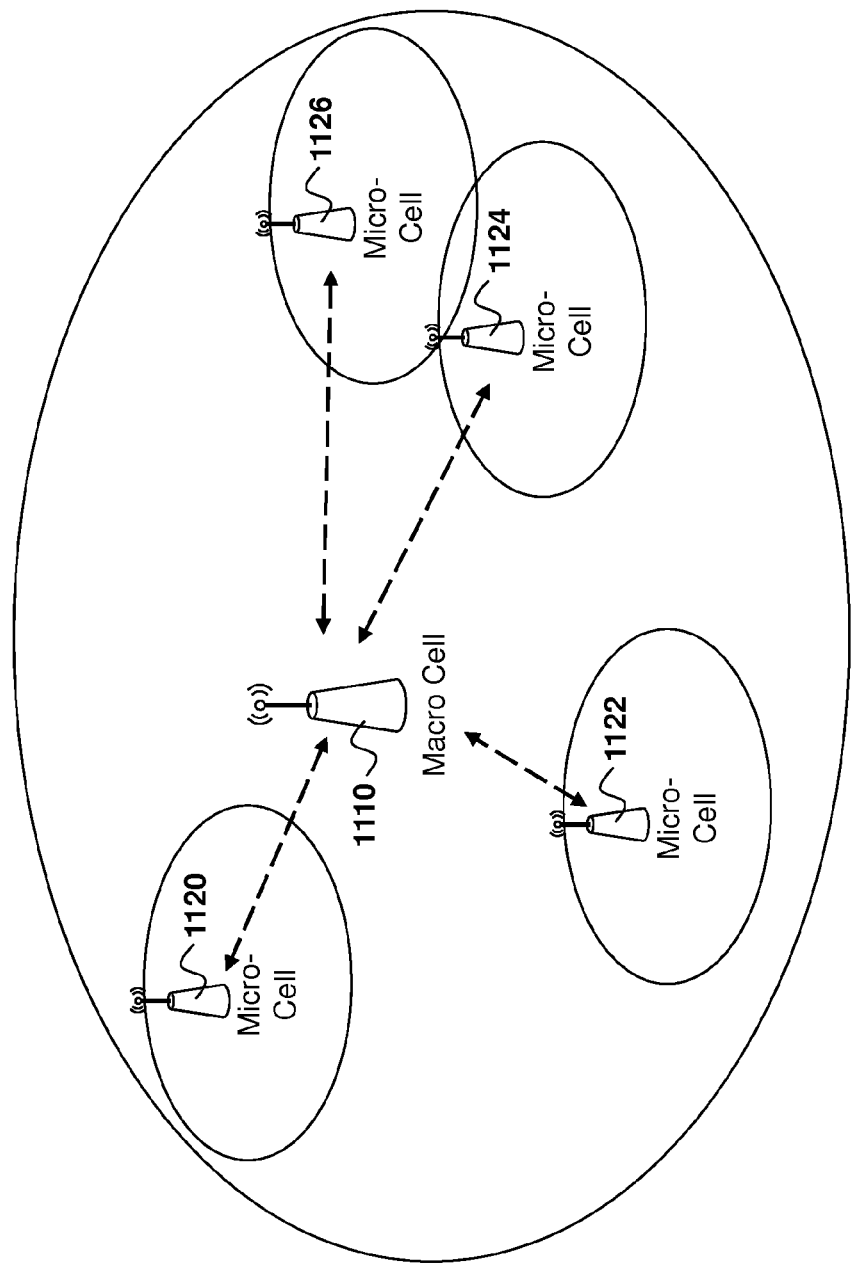
FIG. 11 is a block diagram showing an example heterogeneous network.

In particular, referring to FIG. 11, a macro cell 1110 communicates with a plurality of small cells such as femto cells, pico cells, relays, among others. These are shown with reference numeral 1120, 1122, 1124 and 1126 in the example of FIG. 11. Interference may occur between the small cells or between the macro cell and the small cells.

Further to the above, it is also possible to use centralized coordination approaches controlled by the macro-cell to mitigate inference. The macro-cell has TDD UL/DL configuration information for all of the surrounding micro-cells and can act as a central control point to oversee interference issues and apply interference mitigation schemes accordingly. The macro cell may make the decision on the UL/DL configuration changes to make sure there will be no major interference issues due to the configuration change.

The macro cells and small cells may be implemented using any network element. A simplified network element is shown with regard to FIG. 12.

Figure 12:
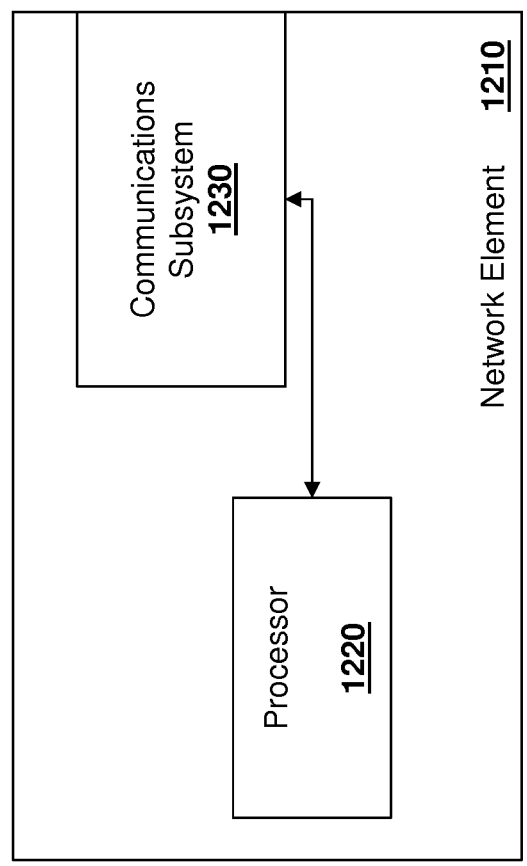
FIG. 12 is a simplified block diagram of an example network element.

In FIG. 12, network element 1210 includes a processor 1220 and a communications subsystem 1230, where the processor 1220 and communications subsystem 1230 cooperate to perform the methods described above.

Further, the above may be implemented by any UE. One exemplary device is described below with regard to FIG. 13.

UE 1300 is typically a two-way wireless communication device having voice and data communication capabilities. UE 1300 generally has the capability to communicate with other computer systems. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1300 is enabled for two-way communication, it may incorporate a communication subsystem 1311, including both a receiver 1312 and a transmitter 1314, as well as associated components such as one or more antenna elements 1316 and 1318, local oscillators (LOs) 1313, and a processing module such as a digital signal processor (DSP) 1320. As will be apparent to those skilled in the field of communications, the particular design of the communication subsystem 1311 will be dependent upon the communication network in which the device is intended to operate. The radio frequency front end of communication subsystem 1311 can be any of the embodiments described above.

Network access requirements will also vary depending upon the type of network 1319. In some networks network access is associated with a subscriber or user of UE 1300. A UE may require a removable user identity module (RUIM) or a subscriber identity module (SIM) card in order to operate on a network. The SIM/RUIM interface 1344 is normally similar to a card-slot into which a SIM/RUIM card can be inserted and ejected. The SIM/RUIM card can have memory and hold many key configurations 1351, and other information 1353 such as identification, and subscriber related information.

Figure 13:
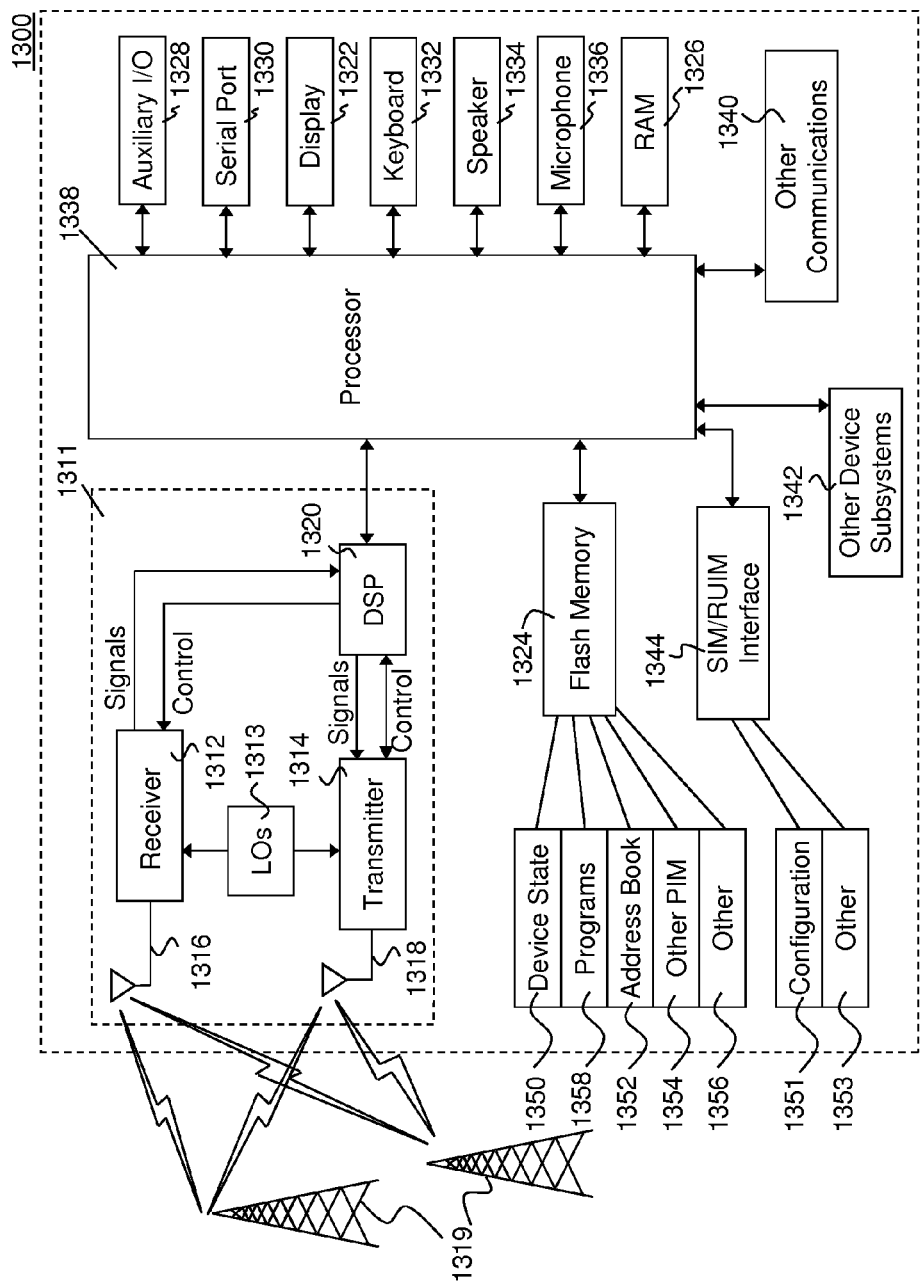
FIG. 13 is a block diagram of an example user equipment.

When required network registration or activation procedures have been completed, UE 1300 may send and receive communication signals over the network 1319. As illustrated in FIG. 13, network 1319 can consist of multiple base stations communicating with the UE.

Signals received by antenna 1316 through communication network 1319 are input to receiver 1312, which may perform such common receiver functions as signal amplification, frequency down conversion, filtering, channel selection and the like. A/D conversion of a received signal allows more complex communication functions such as demodulation and decoding to be performed in the DSP 1320. In a similar manner, signals to be transmitted are processed, including modulation and encoding for example, by DSP 1320 and input to transmitter 1314 for digital to analog conversion, frequency up conversion, filtering, amplification and transmission over the communication network 1319 via antenna 1318. DSP 1320 not only processes communication signals, but also provides for receiver and transmitter control. For example, the gains applied to communication signals in receiver 1312 and transmitter 1314 may be adaptively controlled through automatic gain control algorithms implemented in DSP 1320.

UE 1300 generally includes a processor 1338 which controls the overall operation of the device. Communication functions, including data and voice communications, are performed through communication subsystem 1311. Processor 1338 also interacts with further device subsystems such as the display 1322, flash memory 1324, random access memory (RAM) 1326, auxiliary input/output (I/O) subsystems 1328, serial port 1330, one or more keyboards or keypads 1332, speaker 1334, microphone 1336, other communication subsystem 1340 such as a short-range communications subsystem and any other device subsystems generally designated as 1342. Serial port 1330 could include a USB port or other port known to those in the art.

Some of the subsystems shown in FIG. 13 perform communication-related functions, whereas other subsystems may provide "resident" or on-device functions. Notably, some subsystems, such as keyboard 1332 and display 1322, for example, may be used for both communication-related functions, such as entering a text message for transmission over a communication network, and device-resident functions such as a calculator or task list.

Operating system software used by the processor 1338 may be stored in a persistent store such as flash memory 1324, which may instead be a read-only memory (ROM) or similar storage element (not shown). Those skilled in the art will appreciate that the operating system, specific device applications, or parts thereof, may be temporarily loaded into a volatile memory such as RAM 1326. Received communication signals may also be stored in RAM 1326.

As shown, flash memory 1324 can be segregated into different areas for both computer programs 1358 and program data storage 1350, 1352, 1354 and 1356. These different storage types indicate that each program can allocate a portion of flash memory 1324 for their own data storage requirements. Processor 1338, in addition to its operating system functions, may enable execution of software applications on the UE. A predetermined set of applications that control basic operations, including at least data and voice communication applications for example, will normally be installed on UE 1300 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1319. Further applications may also be loaded onto the UE 1300 through the network 1319, an auxiliary I/O subsystem 1328, serial port 1330, short-range communications subsystem 1340 or any other suitable subsystem 1342, and installed by a user in the RAM 1326 or a non-volatile store (not shown) for execution by the processor 1338. Such flexibility in application installation increases the functionality of the device and may provide enhanced on-device functions, communication-related functions, or both. For example, secure communication applications may enable electronic commerce functions and other such financial transactions to be performed using the UE 1300.

In a data communication mode, a received signal such as a text message or web page download will be processed by the communication subsystem 1311 and input to the processor 1338, which may further process the received signal for output to the display 1322, or alternatively to an auxiliary I/O device 1328.

A user of UE 1300 may also compose data items such as email messages for example, using the keyboard 1332, which may be a complete alphanumeric keyboard or telephone-type keypad, among others, in conjunction with the display 1322 and possibly an auxiliary I/O device 1328. Such composed items may then be transmitted over a communication network through the communication subsystem 1311.

For voice communications, overall operation of UE 1300 is similar, except that received signals would typically be output to a speaker 1334 and signals for transmission would be generated by a microphone 1336. Alternative voice or audio I/O subsystems, such as a voice message recording subsystem, may also be implemented on UE 1300. Although voice or audio signal output is generally accomplished primarily through the speaker 1334, display 1322 may also be used to provide an indication of the identity of a calling party, the duration of a voice call, or other voice call related information for example.

Serial port 1330 in FIG. 13 would normally be implemented in a personal digital assistant (PDA)-type UE for which synchronization with a user's desktop computer (not shown) may be desirable, but is an optional device component. Such a port 1330 would enable a user to set preferences through an external device or software application and would extend the capabilities of UE 1300 by providing for information or software downloads to UE 1300 other than through a wireless communication network. The alternate download path may for example be used to load an encryption key onto the device through a direct and thus reliable and trusted connection to thereby enable secure device communication. As will be appreciated by those skilled in the art, serial port 1330 can further be used to connect the UE to a computer to act as a modem.

Other communications subsystems 1340, such as a short-range communications subsystem, is a further optional component which may provide for communication between UE 1300 and different systems or devices, which need not necessarily be similar devices. For example, the subsystem 1340 may include an infrared device and associated circuits and components or a Bluetooth™ communication module to provide for communication with similarly enabled systems and devices. Subsystem 1340 may further include non-cellular communications such as WiFi, WiMAX, or near field communications (NFC).

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at an evolved Node B (eNB) for a cell operating in time division duplex with a first configuration and having a neighbor cell eNB operating in time division duplex with a second configuration, the method comprising:

receiving, from the neighbor cell eNB an interference overload indicator information element, the interference overload indicator element including interference type field, the interference type field having two potential values, the two potential values comprising a first potential value indicating eNB-to-eNB interference and a second potential value indicating UE-to-UE interference; and performing interference mitigation based on the interference type indication received from the neighbor cell eNB.

2. The method of claim 1, wherein the receiving is over a backhaul.

3. The method of claim 1, wherein the mitigating for eNB-to-eNB interference comprises reducing transmit powers in subframes that can potentially causes eNB-to-eNB interference.

4. The method of claim 3, further comprising scheduling downlink transmission in subframes that can potentially cause eNB-to-eNB interference to user equipments close to a cell center for the eNB.

5. The method of claim 1, wherein the mitigating for eNB-to-eNB interference comprises initiating a frequency reuse plan with the neighbor cell eNB.

6. The method of claim 5, wherein frequency reuse is performed in subframes that may potentially cause eNB-to-eNB interference.

7. The method of claim 1, wherein the mitigating for UE-to-UE interference comprises reducing transmit powers of scheduled user equipments.

8. The method of claim 7, wherein the reducing transport powers is only for user equipments close to a cell edge for the eNB.

9. The method of claim 7, further comprising scheduling uplink transmission in subframes that can potentially cause UE-to-UE interference to user equipments close to a cell center for the eNB.

10. The method of claim 1, wherein the mitigating for UE-to-UE interference comprises initiating a frequency reuse plan with the neighbor cell eNB.

11. The method of claim 10, wherein frequency reuse is performed in subframes that may potentially cause UE-to-UE interference.

12. An evolved Node B (eNB) for a cell operating in time division duplex with a first configuration and having a neighbor cell eNB operating in time division duplex with a second configuration, the eNB comprising:

a processor; and a communications subsystem, wherein the eNB is configured to:

receive, from the neighbor cell eNB an interference overload indicator information element, the interference overload indicator element including interference type field, the interference type field having two potential values, the two potential values comprising a first potential value indicating eNB-to-eNB interference and a second potential value indicating UE-to-UE interference; and perform interference mitigation based on the interference type indication received from the neighbor cell eNB.

13. The eNB of claim 12, wherein the eNB is configured to receive is over a backhaul.

14. The eNB of claim 12, wherein the eNB is configured to mitigate for eNB-to-eNB interference by reducing transmit powers in subframes that can potentially causes eNB-to-eNB interference.

15. The eNB of claim 14, wherein the eNB is further configured to schedule downlink transmission in subframes that can potentially cause eNB-to-eNB interference to user equipments close to a cell center for the eNB.

16. The eNB of claim 12, wherein the eNB is configured to mitigate for eNB-to-eNB interference by initiating a frequency reuse plan with the neighbor cell eNB.

17. The eNB of claim 16, wherein frequency reuse is performed in subframes that may potentially cause eNB-to-eNB interference.

18. The eNB of claim 12, wherein the eNB is configured to mitigate for UE-to-UE interference by reducing transmit powers of scheduled user equipments.

19. The eNB of claim 18, wherein the reducing transport powers is only for user equipments close to a cell edge for the eNB.

20. The eNB of claim 18, wherein the eNB is further configured to schedule uplink transmission in subframes that can potentially cause UE-to-UE interference to user equipments close to a cell center for the eNB.

21. The eNB of claim 12, wherein the eNB is configured to mitigate for UE-to-UE interference by initiating a frequency reuse plan with the neighbor cell eNB.

22. The eNB of claim 12, wherein frequency reuse is performed in subframes that may potentially cause UE-to-UE interference.

* * * * *